(12) United States Patent
Said et al.

(10) Patent No.: US 7,800,616 B2
(45) Date of Patent: Sep. 21, 2010

(54) POLICY ANALYSIS AND ACTION DECISION TOOL

(75) Inventors: Yasmin H. Said, Clarksburg, MD (US); Edward J. Wegman, Fairfax Station, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 429 days.

(21) Appl. No.: 11/679,403

(22) Filed: Feb. 27, 2007

(65) Prior Publication Data

US 2007/0200851 A1    Aug. 30, 2007

Related U.S. Application Data

(60) Provisional application No. 60/776,680, filed on Feb. 27, 2006.

(51) Int. Cl.
*G06T 11/20* (2006.01)

(52) U.S. Cl. ...................................... 345/440

(58) Field of Classification Search ................... 345/440
See application file for complete search history.

(56) References Cited

OTHER PUBLICATIONS

Heckerman, D. et al., "Causal Independence for Probability Assessment and Inference Using Bayesian Networks", Mar. 1994, p. 1-15.*

* cited by examiner

*Primary Examiner*—Ryan R Yang
(74) *Attorney, Agent, or Firm*—David Yee

(57) ABSTRACT

Using stochastic directed graphs, a social network stochastic directed graph model allows for policy analysis and action. An activity generator may be used for creating agents that represent a population stratum. Agents may be proportionally selected to the size of the population stratum and representative activities that are associated with said population stratum. Agents have one or more conditional probabilities attached to the activities, which indicate the likelihood of interaction between agents and one or more agents or actors. Outcomes for the interactions may be accumulated. Based on these outcomes, which include benign and acute, a multinomial probability distribution may be estimated.

18 Claims, 52 Drawing Sheets

S105

Use an activity generator for creating agents that represent a population stratum

S110

Select agents proportionally to the size of the population stratum and representative activities associated with the population stratum, the agents having a conditional probability attached to the activities indicating the likelihood of interaction between the agents with at least one other agent or actor

S115

Accumulate outcomes for the interaction, the outcomes including benign outcomes and acute outcomes

S120

Estimate a multinomial probability distribution based on the outcomes

|  | Alcohol User | Family | Peers @ Work | Friends | Other Users | Alcohol Distributors | Alcohol Producer | Law Enforcement | Courts | Prison | Rehab | Treatment | Health Insurance | DMV |
|---|---|---|---|---|---|---|---|---|---|---|---|---|---|---|
| Alcohol User |  | X | X | X | X | X |  | X | X | X | X | X | X | X |
| Family | X |  | X | X | X |  |  |  |  |  |  |  | X |  |
| Peers @ Work | X | X |  | X |  |  |  |  |  |  |  |  |  |  |
| Friends | X | X | X |  |  |  |  |  |  |  |  |  |  |  |
| Other Users | X | X |  |  |  |  |  |  |  |  |  |  |  |  |
| Alcohol Distribution | X |  |  |  |  |  | X | X |  |  |  |  |  |  |
| Alcohol Producers |  |  |  |  |  | X |  | X |  |  |  |  |  |  |
| Law Enforcement | X |  |  |  |  | X | X |  | X |  |  |  | X |  |
| Courts | X |  |  |  |  |  |  | X |  | X | X |  |  |  |
| Prison | X |  |  |  |  |  |  |  | X |  |  |  |  |  |
| Rehab | X |  |  |  |  |  |  |  | X |  |  | X |  |  |
| Treatment | X |  |  |  |  |  |  |  |  |  | X |  | X |  |
| Health Insurance | X | X |  |  |  |  |  |  |  |  |  | X |  |  |
| DMV | X |  |  |  |  |  |  | X |  |  |  |  |  |  |

FIG. 10

| Zip Code | Place | County | % in FFC | Zip Code Population | Fairfax Population |
|---|---|---|---|---|---|
| 20120 | Centreville | FX and Loudoun | 99.70% | 34,372 | 34,369 |
| 20121 | Centreville | FX | 100.00% | 26,043 | 26,043 |
| 20124 | Clifton | FX | 100.00% | 17,162 | 17,162 |
| 20151 | Chantilly | FX | 100.00% | 14,863 | 14,863 |
| 20170 | Herndon | FX | 100.00% | 38,114 | 38,114 |
| 20171 | Herndon | FX | 100.00% | 33,811 | 33,811 |
| 20190 | Reston | FX | 100.00% | 14,258 | 14,258 |
| 20191 | Reston | FX | 100.00% | 28,881 | 28,881 |
| 20194 | Reston | FX | 100.00% | 12,666 | 12,666 |
| 22003 | Annandale | FX | 100.00% | 53,029 | 53,029 |
| 22015 | Burke | FX | 100.00% | 42,938 | 42,938 |
| 22027 | Dunn Loring | FX | 100.00% | 1,377 | 1,377 |
| 22030 | Fairfax | FX and City of FX | 55.70% | 39,431 | 21,963.00 |
| 22031 | Fairfax | FX and City of FX | 95.80% | 26,768 | 25,644 |
| 22032 | Fairfax | FX and City of FX | 95.70% | 28,866 | 27,644 |
| 22033 | Fairfax | FX | 100.00% | 33,043 | 33,043 |
| 22039 | Fairfax Station | FX | 100.00% | 18,471 | 18,471 |
| 22041 | Falls Church | FX | 100.00% | 26,966 | 26,966 |
| 22042 | Falls Church | FX and City of Falls Church | 98.00% | 30,505 | 29,895 |
| 22043 | Falls Church | FX | 100.00% | 22,815 | 22,815 |
| 22044 | Falls Church | FX and City of Falls Church | 93.20% | 13,109 | 12,218 |
| 22046 | Falls Church | FX and City of Falls Church | 31.10% | 14,252 | 4,432.00 |
| 22060 | Fort Belvoir | FX | 100.00% | 8,100 | 8,100 |
| 22066 | Great Falls | FX and Loudoun | 96.90% | 16,958 | 16,432 |
| 22079 | Lorton | FX | 100.00% | 19,607 | 19,607 |
| 22101 | McLean | FX and Arlington | 99.60% | 28,433 | 28,319 |
| 22102 | McLean | FX | 100.00% | 18,607 | 18,607 |
| 22124 | Oakton | FX | 100.00% | 13,867 | 13,867 |
| 22150 | Springfield | FX | 100.00% | 22,208 | 22,208 |
| 22151 | Springfield | FX | 100.00% | 16,587 | 16,587 |

FIG. 13

| Zip Code | Place | County | % in FFC | Zip Code Population | Fairfax Population |
|---|---|---|---|---|---|
| 22152 | Springfield | FX | 100% | 28,236 | 28,236 |
| 22153 | Springfield | FX | 100% | 33,177 | 33,177 |
| 22180 | Vienna | FX | 100% | 22,021 | 22,021 |
| 22181 | Vienna | FX | 100% | 14,527 | 14,527 |
| 22182 | Vienna | FX | 100% | 22,983 | 22,983 |
| 22302 | Alexandria | FX and City of Alexandria | 6.50% | 15,014 | 976 |
| 22303 | Alexandria | FX | 100% | 14,268 | 14,268 |
| 22304 | Alexandria | FX and City of Alexandria | 0.70% | 40,763 | 285 |
| 22306 | Alexandria | FX | 100% | 28,249 | 28,249 |
| 22307 | Alexandria | FX | 100% | 9,505 | 9,505 |
| 22308 | Alexandria | FX | 100% | 12,554 | 12,554 |
| 22309 | Alexandria | FX | 100% | 29,259 | 29,259 |
| 22310 | Alexandria | FX | 100% | 26,082 | 26,082 |
| 22311 | Alexandria | FX and City of Alexandria | 7.00% | 16,665 | 1,167 |
| 22312 | Alexandria | FX and City of Alexandria | 76.50% | 28,370 | 21,703 |
| 22315 | Alexandria | FX | 100% | 21,901 | 21,901 |

FIG. 14

| Zip Code | Hispanic or Latino | White | Black or African American |
|---|---|---|---|
| 20120 | 2,287 | 24,793 | 2,371 |
| 20121 | 2,648 | 15,860 | 2,619 |
| 20124 | 511 | 12,200 | 409 |
| 20151 | 1,785 | 11,424 | 893 |
| 20170 | 7,117 | 21,669 | 3,130 |
| 20171 | 1,892 | 24,226 | 1,751 |
| 20190 | 1,724 | 9,287 | 1,408 |
| 20191 | 3,467 | 18,459 | 2,939 |
| 20194 | 544 | 10,163 | 681 |
| 22003 | 7,175 | 31,154 | 2,923 |
| 22015 | 3,593 | 29,220 | 2,061 |
| 22027 | 43 | 1,000 | 42 |
| 22030 | 3,812 | 26,290 | 2,877 |
| 22031 | 3,698 | 14,991 | 1,415 |
| 22032 | 1,593 | 21,410 | 1,151 |
| 22033 | 1,802 | 23,667 | 1,635 |
| 22039 | 530 | 15,103 | 673 |
| 22041 | 9,104 | 10,152 | 2,568 |
| 22042 | 6,795 | 15,710 | 1,410 |
| 22043 | 3,182 | 14,203 | 1,099 |
| 22044 | 3,760 | 6,106 | 658 |
| 22046 | 1,543 | 10,853 | 440 |
| 22060 | 786 | 4,322 | 2,419 |
| 22066 | 437 | 14,220 | 324 |
| 22079 | 1,817 | 9,506 | 6,190 |
| 22101 | 1,113 | 22,988 | 473 |
| 22102 | 1,013 | 13,355 | 508 |
| 22124 | 559 | 11,654 | 398 |
| 22150 | 4,143 | 10,919 | 1,597 |
| 22151 | 1,596 | 10,998 | 713 |
| 22152 | 2,323 | 19,363 | 1,622 |
| 22153 | 2,312 | 22,583 | 3,155 |
| 22180 | 1,995 | 15,892 | 745 |

FIG. 15

| Zip Code | Hispanic or Latino | White | Black or African American |
|---|---|---|---|
| 22181 | 946 | 11,230 | 397 |
| 22182 | 810 | 17,549 | 659 |
| 22207 | 2,205 | 24,010 | 1,418 |
| 22302 | 1,593 | 10,781 | 1,409 |
| 22303 | 2,416 | 8,438 | 1,982 |
| 22304 | 6,099 | 19,311 | 9,771 |
| 22306 | 5,471 | 11,928 | 7,541 |
| 22307 | 712 | 7,686 | 650 |
| 22308 | 324 | 11,385 | 312 |
| 22309 | 4,231 | 13,987 | 8,161 |
| 22310 | 2,563 | 17,091 | 2,829 |
| 22311 | 2,607 | 7,326 | 4,213 |
| 22312 | 6,101 | 10,918 | 6,145 |
| 22315 | 1,442 | 14,756 | 2,866 |

FIG. 16

| Zip Code | Alcohol Seller (VA ABC Store) | Gallons sold | Gross sales | Non-alcohol sales | Net Alcohol sales |
|---|---|---|---|---|---|
| 20121 | 14151 Germain Dr. | 53,196 | $3,449,672 | $569,164 | $2,880,507 |
| 20151 | 13944 Lee Jackson Hwy | 53,526 | $3,341,019 | $550,548 | $2,790,471 |
| 20170 | 1238 Elden St. (Herndon) | 45,475 | $2,941,960 | $486,208 | $2,455,753 |
| 20171 | 13300 Franklin Farm Rd. (Herndon) | 3,897 | $245,049 | $40,140 | $204,909 |
| 20171 | 2555 John Milton Dr. | 30,674 | $1,906,781 | $314,535 | $1,592,246 |
| 20194 | 1454 N Point Village SC (Reston) | 44,227 | $2,954,114 | $486,987 | $2,467,127 |
| 22003 | 7200 Little River Tnpk., East | 40,411 | $2,466,360 | $407,894 | $2,058,467 |
| 22015 | 9574 Old Keene Mill Rd. | 29,292 | $1,773,680 | $292,215 | $1,481,465 |
| 22015 | 5739 Burke Centre Pkwy | 20,247 | $1,213,777 | $200,226 | $1,013,552 |
| 22030 | 10308 Willard Way | 1,091 | $65,523 | $10,744 | $54,778 |
| 22041 | 3556-E S. Jefferson St. | 40,087 | $2,525,831 | $415,610 | $2,110,221 |
| 22042 | 7263 Arlington Blvd. | 1,256 | $83,318 | $13,618 | $69,700 |
| 22042 | 8105 Lee Hwy | 32,327 | $2,023,522 | $332,735 | $1,690,787 |
| 22044 | 6198 Arlington Blvd. | 26,126 | $1,591,564 | $262,087 | $1,329,476 |
| 22101 | 1446 Chain Bridge Rd. | 49,673 | $3,277,889 | $540,167 | $2,737,722 |
| 22124 | 2928 Chain Bridge Rd. | 1,006 | $64,262 | $10,484 | $53,778 |
| 22150 | 6400 Springfield Plaza | 43,707 | $2,699,522 | $446,268 | $2,253,254 |
| 22151 | 8966 Burke Lake Rd. | 27,913 | $1,588,288 | $262,226 | $1,326,063 |
| 22180 | 436 East Maple Ave. (Vienna) | 47,601 | $2,884,970 | $473,365 | $2,411,605 |
| 22182 | 8520 Tyco Rd. (Vienna) (conv) | 93,230 | $7,612,546 | $1,263,521 | $6,349,025 |
| 22307 | 1524 Belle View Blvd. | 35,377 | $2,073,786 | $340,799 | $1,732,987 |
| 22309 | 8628 Richmond Hwy | 49,969 | $3,226,636 | $534,318 | $2,692,318 |
| 22309 | 7778 Gunston Plaza | 16,580 | $988,012 | $163,153 | $824,859 |
| 22315 | 5926 Kingstowne Center | 39,633 | $2,541,710 | $418,273 | $2,123,436 |

FIG. 17

| Zip Code | County | Status Privileges | Trade Name |
|---|---|---|---|
| 22180 | Fairfax County | Active Annual Caterers License | Marco Polo Cateres |
| 22150 | Fairfax County | Active Annual Caterers License | R & R Catering |
| 22043 | Fairfax County | Active Annual Caterers License | Doubletree Hotel |
| 22043 | Fairfax County | Active Annual Caterers License | Stratford College |
| 22042 | Fairfax County | Active Annual Caterers License | Fairview Park Marriott |
| 22031 | Fairfax County | Active Annual Caterers License | RSVP Catering |
| 22030 | Fairfax County | Active Annual Caterers License | @ George Mason University |
| 20190 | Fairfax County | Active Annual Caterers License | Hyatt Regency Reston |
| 22102 | Fairfax County | Active Annual Caterers License | Compass Group USA Inc. |
| 22101 | Fairfax County | Active Annual Caterers License | Sodexho Management Inc. |
| 22182 | Fairfax County | Active Annual Mixed Beverage Special Event | The Barns |
| 22182 | Fairfax County | Active Annual Mixed Beverage Special Event | Wolf Trap Foundation |
| 22121 | Fairfax County | Active Annual Mixed Beverage Special Event | Woodlawn Plantation |
| 22151 | Fairfax County | Active Beer Imported – In-State | Guiffre Distributing Company |
| 22150 | Fairfax County | Active Beer Imported – In-State | Premium Distributors of Virginia |
| 22079 | Fairfax County | Active Beer Imported – In-State | Balearic Beverage Distributors |
| 22079 | Fairfax County | Active Beer Imported – In-State | Hop and Wine Beverages LLC |
| 22079 | Fairfax County | Active Beer Imported – In-State | Service Distributing |
| 22032 | Fairfax County | Active Beer Imported – In-State | Stronbol |
| 20191 | Fairfax County | Active Beer Imported – In-State | American Fidelity Trading Ltd |
| 20190 | Fairfax County | Active Beer Imported – In-State | Martlet Importing Co. |
| 20151 | Fairfax County | Active Beer Imported – In-State | Premium Distributors of Virginia |
| 20151 | Fairfax County | Active Beer Imported – In-State | Select Wines |

FIG. 18

| Zip Code | County | Status Privileges | Trade Name |
|---|---|---|---|
| 20151 | Fairfax County | Active Beer Imported – In-State | King Wholesale Inc. |
| 22079 | Fairfax County | Active Beer Imported – In-State | Dionysos Imports Inc. |
| 22079 | Fairfax County | Active Beer Imported – In-State | Eastern Wholesale |
| 22079 | Fairfax County | Active Beer Imported – In-State | Ithaka Imports Inc. |
| 22079 | Fairfax County | Active Beer Imported – In-State | Young Won Trading Inc. |
| 22031 | Fairfax County | Active Beer Imported – In-State | Suprex International Ltd. |
| 20190 | Fairfax County | Active Beer Imported – In-State | Fosters USA LLC |
| 22309 | Fairfax County | Active Beer Off Premises | Rorers Produce |
| 22180 | Fairfax County | Active Beer Off Premises | CVS/Pharmacy 1847 |
| 22180 | Fairfax County | Active Beer Off Premises | Vienna Shell |
| 22180 | Fairfax County | Active Beer Off Premises | Vienna Tiger Mart |
| 22152 | Fairfax County | Active Beer Off Premises | 7 Eleven Store 2581 30479 |
| 22150 | Fairfax County | Active Beer Off Premises | El Mercado |
| 22150 | Fairfax County | Active Beer Off Premises | Interfuel LLC |
| 22046 | Falls Church City | Active Beer Off Premises | Go Cong Supermarket |
| 22046 | Fairfax County | Active Beer Off Premises | Hillwood Mart |
| 22041 | Fairfax County | Active Beer Off Premises | Duangrat Oriental Food Mart |
| 22041 | Fairfax County | Active Beer Off Premises | San Miguel Market |
| 22039 | Fairfax County | Active Beer Off Premises | Exxon #25741 |
| 22033 | Fairfax County | Active Beer Off Premises | Circle K Mobil 5885 |
| 22031 | Fairfax City | Active Beer Off Premises | Phuoc Loc Market |
| 22031 | Fairfax City | Active Beer Off Premises | Citgo 7 Eleven Store 2581 30474 |
| 22030 | Fairfax County | Active Beer Off Premises | Popes Head Market |
| 22030 | Fairfax City | Active Beer Off Premises | Fairfax Texaco Shell |
| 22030 | Fairfax City | Active Beer Off Premises | E & C VA 210 |

FIG. 19

| Zip Code | Quantity | Alcohol Seller (VA ABC Quantity) | City |
|---|---|---|---|
| 22027 | 1 | | Dunn Loring |
| 22181 | 1 | | Vienna |
| 22304 | 3 | | Alexandria |
| 20194 | 4 | 1 | Reston |
| 22060 | 5 | | Fort Belvoir |
| 20124 | 6 | | Clifton |
| 22308 | 6 | | Alexandria |
| 22039 | 8 | | Fairfax Station / Fairfax |
| 22307 | 8 | 1 | Alexandria |
| 22124 | 10 | 1 | Oakton |
| 22046 | 11 | | Falls Church |
| 22043 | 12 | | Falls Church |
| 22032 | 14 | | Fairfax |
| 20191 | 15 | | Reston |

FIG. 20

| Zip Code | Quantity | Alcohol Seller (VA ABC Quantity) | City |
|---|---|---|---|
| 22152 | 16 | | Springfield / West Springfield |
| 22153 | 16 | | Springfield |
| 20120 | 19 | | Centreville |
| 22066 | 21 | | Great Falls / Fairfax |
| 22151 | 21 | 1 | Springfield |
| 22303 | 22 | | Alexandria |
| 22312 | 25 | | Alexandria |
| 22315 | 25 | 1 | Alexandria / Fairfax |
| 20121 | 27 | 1 | Centreville |
| 22031 | 28 | | Fairfax |
| 22310 | 28 | | Alexandria / Franconia |
| 22015 | 29 | 2 | Burke |
| 22182 | 34 | 1 | Vienna/Tysons Corner/Fairfax |
| 20171 | 35 | 2 | Herndon |
| 22306 | 35 | | Alexandria / Groveton |
| 22044 | 36 | 1 | Falls Church / Fairfax |
| 22309 | 40 | 2 | Alexandria |
| 22030 | 45 | 1 | Fairfax |
| 22033 | 46 | | Fairfax / Chantilly |
| 22102 | 48 | | McLean / Tysons Corner |

FIG. 21

| Zip Code | Quantity | Alcohol Seller (VA ABC Quantity) | City |
| --- | --- | --- | --- |
| 20190 | 50 | | Reston / Herndon / Fairfax |
| 20151 | 51 | 1 | Chantilly |
| 22101 | 52 | 1 | McLean / Fairfax |
| 22041 | 62 | 1 | Falls Church / Baileys Crossroads / Fairfax / Lorton |
| 22079 | 63 | 1 | Lorton / Fairfax / Mason Neck |
| 22170 | 65 | 1 | Herndon |
| 22180 | 66 | 1 | Vienna |
| 22042 | 68 | 2 | Falls Church / Fairfax |
| 22003 | 69 | 1 | Annandale |
| 22150 | 78 | 1 | Springfield / Fairfax |

FIG. 22

| Planning District and City/County | Deaths from All Causes | | Unintentional Injury | | Suicide | | Chronic Liver Disease | | Homicide and Legal Intervention | |
|---|---|---|---|---|---|---|---|---|---|---|
| | Number | Rate | Number | Rate | Number | Rate | Number | Rate | Number | Rate |
| COMMONWEALTH OF VIRGINIA | 56,095 | 866.9 | 2,357 | 34.8 | 779 | 10.8 | 571 | 8.3 | 449 | 6.2 |
| PLANNING DISTRICT 1 | 1,142 | 1,079.0 | 59 | 52.7 | 28 | 29.4 | 12 | 11.4 | 7 | 7.9 |
| LEE COUNTY | 301 | 1,086.7 | 20 | 84.1 | 6 | 25.8 | 4 | 14.7 | 2 | 8.4 |
| SCOTT COUNTY | 317 | 1,020.3 | 16 | 62.5 | 12 | 43.4 | 1 | 4.7 | 3 | 14.1 |
| WISE COUNTY | 455 | 1,067.9 | 20 | 50.3 | 10 | 25.1 | 4 | 8.8 | 2 | 4.8 |
| NORTON CITY | 69 | 1,486.4 | 3 | 69.8 | | | 3 | 65.0 | | |
| PLANNING DISTRICT 2 | 1,229 | 979.6 | 65 | 53.9 | 25 | 19.6 | 18 | 13.5 | 11 | 9.4 |
| BUCHANAN COUNTY | 264 | 1,050.7 | 16 | 53.8 | 3 | 11.5 | 6 | 22.6 | 2 | 8.2 |
| DICKENSON COUNTY | 166 | 916.2 | 10 | 60.9 | 3 | 18.1 | 7 | 36.1 | 1 | 6.3 |
| RUSSELL COUNTY | 310 | 1,003.0 | 18 | 60.1 | 8 | 24.5 | 2 | 6.0 | 5 | 16.8 |
| TAZEWELL COUNTY | 489 | 951.4 | 21 | 46.3 | 11 | 22.6 | 3 | 5.8 | 3 | 7.0 |
| PLANNING DISTRICT 3 | 2,192 | 935.3 | 92 | 44.9 | 31 | 15.1 | 19 | 8.4 | 7 | 3.3 |
| BLAND COUNTY | 89 | 1,070.0 | 4 | 61.9 | | | | | | |
| CARROLL COUNTY | 293 | 808.8 | 11 | 30.1 | 7 | 24.4 | 2 | 6.2 | 1 | 3.5 |
| GRAYSON COUNTY | 223 | 1,003.5 | 19 | 99.2 | 2 | 9.6 | 1 | 3.9 | | |
| SMYTH COUNTY | 394 | 971.6 | 12 | 34.4 | 5 | 14.8 | 3 | 7.9 | 1 | 2.8 |
| WASHINGTON COUNTY | 453 | 772.1 | 25 | 47.1 | 11 | 18.6 | 4 | 5.9 | 4 | 6.4 |
| WYTHE COUNTY | 312 | 931.9 | 11 | 38.2 | 2 | 5.6 | 4 | 11.6 | | |
| BRISTOL CITY | 300 | 1,176.5 | 8 | 41.4 | 4 | 22.2 | 3 | 18.4 | | |
| GALAX CITY | 127 | 1,396.4 | 2 | 24.6 | | | 2 | 27.3 | 1 | 17.5 |

FIG. 23

| Planning District and City/County | Deaths from All Causes | | Unintentional Injury | | Suicide | | Chronic Liver Disease | | Homicide and Legal Intervention | |
|---|---|---|---|---|---|---|---|---|---|---|
| | Number | Rate | Number | Rate | Number | Rate | Number | Rate | Number | Rate |
| PLANNING DISTRICT 4 | 1,364 | 917.7 | 65 | 44.1 | 17 | 10.7 | 13 | 8.7 | 6 | 3.0 |
| FLOYD COUNTY | 132 | 751.7 | 13 | 91.6 | | | 2 | 11.6 | | |
| GILES COUNTY | 202 | 990.3 | 11 | 68.6 | 6 | 32.6 | 2 | 9.9 | | |
| MONTGOMERY COUNTY | 482 | 830.3 | 20 | 31.2 | 3 | 2.5 | 7 | 11.7 | 2 | 2.8 |
| PULASKI COUNTY | 426 | 1,047.8 | 21 | 57.4 | 4 | 10.3 | 2 | 4.8 | 2 | 6.4 |
| RADFORD CITY | 122 | 1,085.2 | 3 | 28.8 | 4 | 40.9 | | | 2 | 3.8 |
| PLANNING DISTRICT 5 | 3,038 | 934.5 | 99 | 34.0 | 49 | 17.4 | 36 | 11.7 | 18 | 6.0 |
| ALLEGHANY COUNTY | 123 | 806.5 | 3 | 21.9 | 1 | 5.3 | 2 | 12.6 | | |
| BOTETOURT COUNTY | 246 | 861.6 | 14 | 51.4 | 5 | 15.8 | 2 | 5.1 | 2 | 5.1 |
| CRAIG COUNTY | 40 | 769.6 | | | | | 1 | 17.4 | | |
| ROANOKE COUNTY | 926 | 882.7 | 31 | 33.7 | 17 | 16.2 | 12 | 11.7 | 1 | 0.9 |
| CLIFTON FORGE CITY | 91 | 1,119.9 | 4 | 55.8 | | | | | | |
| COVINGTON CITY | 112 | 1,162.8 | 3 | 41.2 | 2 | 32.1 | 2 | 26.2 | | |
| ROANOKE CITY | 1,168 | 985.5 | 31 | 28.0 | 21 | 20.9 | 13 | 12.8 | 12 | 13.4 |
| SALEM CITY | 330 | 1,086.6 | 13 | 46.7 | 3 | 9.2 | 4 | 14.4 | 1 | 4.4 |

FIG. 24

| Planning District and City/County | Deaths from All Causes | | Unintentional Injury | | Suicide | | Chronic Liver Disease | | Homicide and Legal Intervention | |
|---|---|---|---|---|---|---|---|---|---|---|
| | Number | Rate | Number | Rate | Number | Rate | Number | Rate | Number | Rate |
| PLANNING DISTRICT 6 | 2,372 | 851.3 | 88 | 31.6 | 28 | 10.8 | 21 | 7.6 | 8 | 3.1 |
| AUGUSTA COUNTY | 468 | 719.0 | 13 | 20.8 | 5 | 8.9 | 5 | 6.5 | 1 | 1.0 |
| BATH COUNTY | 74 | 1,220.0 | 6 | 117.0 | 1 | 17.9 | | | | |
| HIGHLAND COUNTY | 27 | 723.5 | 2 | 53.8 | | | | | | |
| ROCKBRIDGE COUNTY | 178 | 790.7 | 15 | 72.3 | 2 | 11.1 | 2 | 7.9 | | |
| ROCKINGHAM COUNTY | 636 | 739.8 | 21 | 31.2 | 5 | 7.1 | | | 2 | 3.0 |
| BUENA VISTA CITY | 88 | 1,102.1 | 4 | 52.5 | 1 | 19.7 | | | | |
| HARRISONBURG CITY | 296 | 946.1 | 12 | 35.9 | 2 | 7.6 | 4 | 15.2 | 2 | 6.2 |
| LEXINGTON CITY | 123 | 1,410.7 | 1 | 8.7 | 2 | 39.2 | 1 | 10.7 | | |
| STAUNTON CITY | 313 | 953.3 | 4 | 15.0 | 7 | 28.4 | 4 | 14.1 | | |
| WAYNESBORO CITY | 266 | 1,049.8 | 8 | 35.2 | 3 | 15.3 | 5 | 22.3 | 3 | 14.9 |
| PLANNING DISTRICT 7 | 1,660 | 868.5 | 67 | 36.1 | 25 | 13.7 | 23 | 11.3 | 6 | 3.2 |
| CLARKE COUNTY | 130 | 906.2 | 1 | 11.3 | 1 | 10.0 | 2 | 13.6 | | |
| FREDERICK COUNTY | 373 | 752.7 | 18 | 32.0 | 5 | 9.0 | 8 | 13.8 | 2 | 3.7 |
| PAGE COUNTY | 233 | 871.2 | 12 | 47.0 | 1 | 3.3 | 2 | 7.5 | 1 | 4.5 |
| SHENANDOAH COUNTY | 363 | 816.6 | 17 | 48.8 | 9 | 22.9 | 4 | 9.9 | 1 | 3.2 |
| WARREN COUNTY | 301 | 959.9 | 11 | 37.4 | 6 | 19.7 | 4 | 12.0 | 1 | 3.3 |
| WINCHESTER CITY | 260 | 1,021.1 | 8 | 32.9 | 5 | 21.2 | 3 | 11.7 | 1 | 4.6 |

FIG. 25

| Planning District and City/County | Deaths from All Causes | | Unintentional Injury | | Suicide | | Chronic Liver Disease | | Homicide and Legal Intervention | |
|---|---|---|---|---|---|---|---|---|---|---|
| | Number | Rate | Number | Rate | Number | Rate | Number | Rate | Number | Rate |
| PLANNING DISTRICT 8 | 8,448 | 726.2 | 359 | 24.4 | 139 | 8.0 | 77 | 5.3 | 50 | 2.8 |
| ARLINGTON COUNTY | 1,102 | 698.0 | 34 | 17.3 | 15 | 8.2 | 5 | 2.8 | 7 | 3.7 |
| FAIRFAX COUNTY | 4,210 | 673.1 | 186 | 24.1 | 69 | 7.4 | 34 | 4.2 | 26 | 2.7 |
| LOUDOUN COUNTY | 695 | 827.5 | 34 | 30.7 | 10 | 9.1 | 5 | 4.7 | 1 | 0.9 |
| PRINCE WILLIAM COUNTY | 1,130 | 888.6 | 57 | 29.5 | 32 | 11.2 | 12 | 6.5 | 10 | 3.3 |
| ALEXANDRIA CITY | 833 | 792.6 | 26 | 21.6 | 6 | 4.9 | 11 | 10.1 | 5 | 4.3 |
| FAIRFAX CITY | 140 | 640.5 | 3 | 15.0 | 2 | 9.6 | 3 | 13.5 | | |
| FALLS CHURCH CITY | 71 | 612.1 | 2 | 18.9 | 2 | 20.8 | 2 | 18.4 | | |
| MANASSAS CITY | 215 | 1,262.0 | 14 | 51.1 | 2 | 4.7 | 2 | 12.2 | 1 | 7.5 |
| MANASSAS PARK CITY | 52 | 1,511.6 | 3 | 75.6 | 1 | 21.2 | 3 | 51.1 | | |

Note: Age adjusted rates are derived by applying age group population relatives from the standard U.S. Census of population to the current age-specific rates of the same population groups. They are more comparable between populations with different age distributions than are unadjusted rates bases on their populations. The National Center for Health Statistics suggests the use of the 2000 population relatives for use by the states for comparative purposes. The adjusted rates lie below the unadjusted rates after the base year as a population ages.

FIG. 26

| ALCOHOL INDUCED DEATHS BY THE NATIONAL CENTER FOR HEALTH STATISTICS CLASSIFICATION WITH ICD 10 CODES | TOTAL DEATHS | WHITE RACE MALE | WHITE RACE FEMALE | BLACK RACE MALE | BLACK RACE FEMALE | ALL OTHER RACES MALE | ALL OTHER RACES FEMALE |
|---|---|---|---|---|---|---|---|
| TOTAL ALCOHOL INDUCED DEATHS | 352 | 208 | 59 | 68 | 14 | 3 | |
| Alcohol Acute Intoxication (F100) | 6 | 2 | 1 | 3 | | | |
| Alcohol Harmful Use ...... (F101) | 30 | 16 | 5 | 8 | 1 | | |
| Alcohol Dependence Syndrome (F102) | 61 | 41 | 6 | 11 | 3 | | |
| Alcohol Other Behavioral Disorders (F103-F109) | 15 | 7 | 2 | 4 | 1 | 1 | |
| Alcoholic Degeneration of Nervous System (G312) | 4 | 1 | 1 | 2 | | | |
| Alcoholic Polyneuropathy (G621) | 1 | 1 | | | | | |
| Alcoholic Cardiomyopathy (I426) | 7 | 4 | 1 | 2 | | | |
| Alcoholic Gastritis (K292) | 2 | 2 | | | | | |
| Alcoholic Liver Disease (K70) | 208 | 121 | 40 | 36 | 9 | 2 | |
| Excessive Blood Level of Alcohol (R780) | | | | | | | |
| Accidental Poisoning by Alcohol (X45) | 18 | 13 | 3 | 2 | | | |
| Intentional Self-Poisoning by Alcohol (X65) | | | | | | | |
| Undetermined Intent Poisoning by Alcohol (Y15) | | | | | | | |

NOTE: The Table Excludes Deaths Due To Accidents, Homicides, And Other Causes Indirectly Related To Alcohol.

FIG. 27

| Zip Code | Total Deaths | White Race | | Black Race | | Other Race | |
|---|---|---|---|---|---|---|---|
| | | Male | Female | Male | Female | Male | Female |
| 20120 | 1 | 1 | 0 | 0 | 0 | 0 | 0 |
| 20190 | 1 | 0 | 1 | 0 | 0 | 0 | 0 |
| 22003 | 1 | 0 | 1 | 0 | 0 | 0 | 0 |
| 22015 | 3 | 0 | 0 | 1 | 0 | 1 | 1 |
| 22021 | 2 | 0 | 0 | 0 | 0 | 1 | 1 |
| 22041 | 4 | 1 | 0 | 1 | 0 | 1 | 1 |
| 22046 | 1 | 1 | 0 | 0 | 0 | 0 | 0 |
| 22101 | 1 | 1 | 0 | 0 | 0 | 0 | 0 |
| 22303 | 1 | 1 | 0 | 0 | 0 | 0 | 0 |
| 22306 | 1 | 1 | 0 | 0 | 0 | 0 | 0 |
| 22309 | 1 | 1 | 0 | 0 | 0 | 0 | 0 |
| 22310 | 2 | 2 | 0 | 0 | 0 | 0 | 0 |
| 22312 | 1 | | 1 | 0 | 0 | 0 | 0 |
| All | 20 | 9 | 3 | 2 | 0 | 3 | 3 |

Note: The table excludes deaths due to accidents, homicides, and other causes indirectly related to alcohol.
All zip codes not included in this table had no alcohol-related deaths.

FIG. 28

| Veh-Document Number | Veh-Number | Veh-Licensed State | Veh-Insurance Indicator | Veh-Type | Veh-Age | Veh-Estimated Speed | Veh-Manuver | Veh-Point of Impact | Veh-Damage | Veh-Repair Cost | Veh-DL CDL |
|---|---|---|---|---|---|---|---|---|---|---|---|
| 3391097 | 2 | 34 | 1 | 5 | 2 | 50 | 1 | 5 | 8 | 100 | 2 |
| 542066 | 1 | 47 | 1 | 2 | 7 | 20 | 1 | 1 | 6 | 4000 | 0 |
| 542066 | 2 | 47 | 1 | 2 | 1 | 35 | 1 | 3 | 1 | 5000 | 0 |
| 542067 | 1 | 47 | 1 | 2 | 14 | 999 | 1 | 1 | 1 | 2500 | 1 |
| 542067 | 2 | 47 | 1 | 2 | 24 | 999 | 8 | 5 | 1 | 1000 | 1 |
| 462172 | 1 | 47 | 1 | 1 | 10 | 3 | 7 | 8 | 8 | 1000 | 1 |
| 462172 | 2 | 47 | 1 | 1 | 6 | 25 | 1 | 3 | 8 | 1500 | 1 |
| 462176 | 1 | 47 | 1 | 1 | 15 | 10 | 3 | 1 | 6 | 4000 | 1 |
| 462176 | 2 | 47 | 1 | 1 | 99 | 20 | 1 | 2 | 8 | 3000 | 1 |
| 542527 | 1 | 47 | 1 | 1 | 2 | 0 | 1 | 4 | 1 | 4000 | 1 |
| 542076 | 1 | 47 | 3 | 3 | 10 | 35 | 1 | 1 | 1 | 1500 | 1 |
| 542076 | 2 | 47 | 1 | 1 | 5 | 5 | 1 | 5 | 1 | 500 | 1 |
| 542080 | 1 | 47 | 1 | 1 | 5 | 15 | 4 | 1 | 8 | 2000 | 1 |
| 542080 | 2 | 47 | 1 | 2 | 1 | 25 | 1 | 1 | 8 | 1500 | 1 |
| 530233 | 1 | 47 | 1 | 5 | 4 | 0 | 15 | 1 | 6 | 500000 | 2 |
| 331763 | 1 | 47 | 1 | 1 | 1 | 45 | 1 | 1 | 8 | 6000 | 1 |
| 331763 | 2 | 47 | 1 | 1 | 10 | 10 | 3 | 6 | 8 | 2000 | 1 |

FIG. 29

| Veh-Document Number | Veh-Number | Veh-Licensed State | Veh-Insurance Indicator | Veh-Type | Veh-Age | Veh-Estimated Speed | Veh-Manuver | Veh-Point of Impact | Veh-Damage | Veh-Repair Cost | Veh-DL CDL |
|---|---|---|---|---|---|---|---|---|---|---|---|
| 332720 | 1 | 33 | 1 | 1 | 13 | 20 | 3 | 1 | 8 | 800 | 1 |
| 332720 | 2 | 47 | 1 | 4 | 7 | 35 | 1 | 6 | 8 | 200 | 1 |
| 380217 | 1 | 47 | 1 | 3 | 2 | 20 | 1 | 8 | 8 | 6000 | 1 |
| 380217 | 2 | 34 | 1 | 1 | 10 | 25 | 3 | 8 | 8 | 4000 | 1 |
| 560386 | 1 | 47 | 1 | 2 | 4 | 55 | 1 | 2 | 8 | 4000 | 1 |
| 462680 | 1 | 52 | 3 | 0 | 99 | 40 | 9 | 5 | 1 | 100 | 0 |
| 120020 | 1 | 47 | 1 | 1 | 1 | 80 | 10 | 1 | 6 | 19000 | 1 |
| 120021 | 1 | 47 | 1 | 1 | 6 | 45 | 1 | 1 | 8 | 2000 | 1 |
| 120025 | 1 | 52 | 2 | 3 | 12 | 45 | 1 | 1 | 8 | 2000 | 1 |
| 321357 | 1 | 52 | 1 | 1 | 15 | 0 | 8 | 5 | 8 | 300 | 1 |

FIG. 30

| Case No. | Date | Subcensus | Patrol Area | Final Event Type |
|---|---|---|---|---|
| 2000139002643 | 5/18/00 | 40202 | 440 | Aggravated Assault |
| 2000254000280 | 9/10/00 | 15102 | 210 | Aggravated Assault |
| 2000276000097 | 10/2/00 | 52504 | 431 | Aggravated Assault |
| 2000157001679 | 6/5/00 | 50901 | 400 | Aggravated Assault |
| 200026000248 | 9/16/00 | 52103 | 600 | Aggravated Assault |
| 2000057000322 | 2/26/00 | 15401 | 211 | Aggravated Assault |
| 2000092001988 | 4/1/00 | 21501 | 220 | Aggravated Assault |
| 2000325001262 | 11/20/00 | 21101 | 631 | Aggravated Assault |
| 2000203002742 | 7/21/00 | 16101 | 240 | Aggravated Assault |
| 2000248001983 | 9/4/00 | 82201 | 510 | Aggravated Assault |
| 2000186001811 | 7/4/00 | 81901 | 511 | Aggravated Assault |
| 2000169001996 | 6/17/00 | 82101 | 511 | Aggravated Assault |
| 2000336002262 | 12/1/00 | 82301 | 530 | Aggravated Assault |
| 2000332002205 | 11/27/00 | 82301 | 530 | Aggravated Assault |
| 2000284002090 | 10/10/00 | 81104 | 520 | Aggravated Assault |
| 2000234002488 | 8/21/00 | 15401 | 211 | Aggravated Assault |
| 2000186002165 | 7/4/00 | 15401 | 211 | Aggravated Assault |
| 2000317000438 | 11/12/00 | 51501 | 410 | Aggravated Assault |
| 2000058000200 | 2/27/00 | 51501 | 410 | Aggravated Assault |
| 2000155000148 | 6/3/00 | 40202 | 440 | Aggravated Assault |
| 2000328001380 | 11/23/00 | 51603 | 411 | Aggravated Assault |
| 2000212000162 | 7/30/00 | 15102 | 210 | Drinking while driving |
| 2000165000009 | 6/13/00 | 15403 | 211 | Drinking while driving |
| 2000171000394 | 6/19/00 | 90104 | 110 | Drinking while driving |

FIG. 31

| Case No. | Date | Subcensus | Patrol Area | Final Event Type |
|---|---|---|---|---|
| 2000321000057 | 11/16/00 | 22401 | 630 | Drug Event |
| 2000140000065 | 5/19/00 | 81001 | 521 | Drug Event |
| 2000309001962 | 11/4/00 | 15201 | 210 | Drug Event |
| 2000214000025 | 8/1/00 | 60504 | 330 | Drug Event |
| 2000208002076 | 7/26/00 | 15501 | 230 | Drug Event |
| 2000033001402 | 2/2/00 | 21001 | 620 | Drug Event |
| 2000353001728 | 12/18/00 | 80502 | 510 | Drug Event |
| 2000237001107 | 8/24/00 | 70602 | 320 | Drug Event |
| 2000204000981 | 7/22/00 | 81001 | 521 | Drug Event |
| 2000059000119 | 2/28/00 | 15201 | 210 | Drug Event |
| 2000064000134 | 3/4/00 | 32201 | 711 | Drug Event |
| 2000042001823 | 2/11/00 | 51501 | 410 | Drug Event |
| 2000095002063 | 4/4/00 | 15301 | 210 | Drug Event |
| 2000232001714 | 8/19/00 | 91304 | 101 | Drug Event |
| 2000259000031 | 9/15/00 | 61202 | 830 | Drug Event |
| 2000296001918 | 10/22/00 | 61501 | 831 | Drunk in Public |
| 2000334000509 | 11/29/00 | 61501 | 831 | Drunk in Public |
| 2000002000600 | 1/2/00 | 50101 | 341 | Drunk in Public |

FIG. 32

| Case No. | Date | Subcensus | Patrol Area | Final Event Type |
|---|---|---|---|---|
| 2000201000060 | 7/19/00 | 15401 | 211 | Drunk in Public |
| 2000249002162 | 9/5/00 | 15401 | 211 | Drunk in Public |
| 2000329000019 | 11/24/00 | 15401 | 211 | Drunk in Public |
| 2000152001273 | 5/31/00 | 61601 | 831 | Drunk in Public |
| 2000152002382 | 5/31/00 | 61701 | 331 | Drunk in Public |
| 2000330000183 | 11/25/00 | 61701 | 331 | Drunk in Public |
| 2000347002153 | 12/12/00 | 40201 | 331 | Drunk in Public |
| 2000124001524 | 5/3/00 | 50501 | 400 | Drunk in Public |
| 2000143001961 | 5/22/00 | 50501 | 400 | Drunk in Public |
| 2000154002017 | 6/2/00 | 51501 | 410 | Drunk in Public |
| 2000279002296 | 10/5/00 | 51501 | 410 | Drunk in Public |
| 2000316002198 | 11/11/00 | 51501 | 410 | Drunk in Public |
| 2000020001587 | 1/20/00 | 51501 | 410 | Drunk in Public |
| 2000023000472 | 1/23/00 | 51501 | 410 | Drunk in Public |
| 2000048001823 | 2/17/00 | 51501 | 410 | Drunk in Public |
| 2000091000713 | 3/31/00 | 51501 | 410 | Drunk in Public |
| 2000100001953 | 4/9/00 | 51501 | 410 | Drunk in Public |
| 2000107000009 | 4/16/00 | 51401 | 401 | Drunk in Public |
| 2000113001960 | 4/22/00 | 51501 | 410 | Drunk in Public |
| 2000188002172 | 7/6/00 | 51501 | 410 | Drunk in Public |
| 2000259002493 | 9/15/00 | 51501 | 410 | Drunk in Public |
| 2000276002339 | 10/2/00 | 51501 | 410 | Drunk in Public |
| 2000293000008 | 10/19/00 | 51401 | 401 | Drunk in Public |
| 2000294002151 | 10/20/00 | 51401 | 401 | Drunk in Public |
| 2000334002280 | 11/29/00 | 51501 | 410 | Drunk in Public |
| 2000340001589 | 12/5/00 | 51501 | 410 | Drunk in Public |
| 2000163000284 | 6/11/00 | 50204 | 342 | Drunk in Public |
| 2000030000185 | 1/30/00 | 51501 | 410 | Drunk in Public |

FIG. 33

| Case No. | Date | Subcensus | Patrol Area | Final Event Type |
|---|---|---|---|---|
| 2000358001895 | 12/23/00 | 22101 | 640 | DWI 2nd |
| 2000360000032 | 12/25/00 | 51503 | 420 | DWI 2nd |
| 2000360000124 | 12/25/00 | 70403 | 311 | DWI 2nd |
| 2000192002337 | 7/10/00 | 61102 | 831 | DWI 3rd |
| 2000228001741 | 8/15/00 | 22301 | 630 | DWI 3rd |
| 2000184000042 | 7/2/00 | 32801 | 730 | DWI 3rd |
| 2000110000060 | 4/19/00 | 21004 | 620 | DWI 3rd |
| 2000221001391 | 8/8/00 | 15102 | 210 | DWI 3rd |
| 2000243000019 | 8/30/00 | 21003 | 620 | DWI 3rd |
| 2000260000039 | 9/16/00 | 40504 | 820 | DWI 3rd |
| 2000263000046 | 9/19/00 | 71302 | 340 | DWI 3rd |
| 2000217002555 | 8/4/00 | 20102 | 620 | DWI 3rd w/ < 5 |
| 2000217002349 | 8/4/00 | 60602 | 330 | DWI 3rd w/in 5-10 yrs |
| 2000295002111 | 10/21/00 | 50702 | 441 | DWI 3rd w/in 5-10 yrs |
| 2000192000889 | 7/10/00 | 50501 | 400 | Embezzlement |
| 2000088001257 | 3/28/00 | 51504 | 420 | Embezzlement |
| 2000340002000 | 12/5/00 | 31801 | 710 | Embezzlement |

FIG. 34

| Case No. | Date | Subcensus | Patrol Area | Final Event Type |
|---|---|---|---|---|
| 2000321000679 | 11/16/00 | 50304 | 342 | Embezzlement |
| 2000217000746 | 8/4/00 | 50702 | 441 | Embezzlement |
| 2000024001442 | 1/24/00 | 80205 | 302 | Embezzlement |
| 2000121001490 | 4/30/00 | 80205 | 302 | Embezzlement |
| 2000322001851 | 11/17/00 | 80205 | 302 | Embezzlement |
| 2000340000837 | 12/5/00 | 61604 | 340 | Embezzlement |
| 2000096001172 | 4/5/00 | 61605 | 331 | Embezzlement |
| 2000343000648 | 12/8/00 | 50103 | 341 | Embezzlement |
| 2000279001245 | 10/5/00 | 61701 | 331 | Embezzlement |
| 2000337001714 | 12/2/00 | 40201 | 331 | Illegal Poss Alcohol <21 |
| 2000339000735 | 12/4/00 | 61802 | 830 | Illegal Poss Alcohol <21 |
| 2000343002533 | 12/8/00 | 82203 | 511 | Illegal Poss Alcohol <21 |
| 2000344002033 | 12/9/00 | 22101 | 640 | Illegal Poss Alcohol <21 |
| 2000345000088 | 12/10/00 | 92001 | 121 | Illegal Poss Alcohol <21 |
| 2000347000205 | 12/12/00 | 80303 | 310 | Illegal Poss Alcohol <21 |
| 2000351000044 | 12/16/00 | 82301 | 530 | Illegal Poss Alcohol <21 |
| 2000351002011 | 12/16/00 | 22201 | 740 | Illegal Poss Alcohol <21 |
| 2000362002035 | 12/27/00 | 91304 | 101 | Illegal Poss Alcohol <21 |
| 2000365001837 | 12/30/00 | 52105 | 601 | Illegal Poss Alcohol <21 |
| 2000273002454 | 9/29/00 | 80503 | 510 | Liquor - Illegal Purch/Poss Minor |
| 2000330001833 | 11/25/00 | 70802 | 320 | Liquor - Illegal Purch/Poss Minor |
| 2000106000203 | 4/15/00 | 81902 | 511 | Liquor - Illegal Purch/Poss Minor |
| 2000010000068 | 1/10/00 | 81102 | 521 | Liquor - Illegal Purch/Poss Minor |

FIG. 35

| Case No. | Date | Subcensus | Patrol Area | Final Event Type |
|---|---|---|---|---|
| 2000348000176 | 12/13/00 | 15403 | 211 | Poss open alcohol container |
| 2000177001391 | 6/25/00 | 52801 | 421 | Possess alcohol in park |
| 2000209002152 | 7/27/00 | 30801 | 721 | Possess alcohol in park |
| 2000049000621 | 2/18/00 | 80502 | 510 | Purchase/Poss Tobacco |
| 2000102001256 | 4/11/00 | 80502 | 510 | Purchase/Poss Tobacco |
| 2000125001014 | 5/4/00 | 80502 | 510 | Purchase/Poss Tobacco |
| 2000270001612 | 9/26/00 | 80502 | 510 | Purchase/Poss Tobacco |
| 2000280000544 | 10/6/00 | 82201 | 510 | Purchase/Poss Tobacco |
| 2000290001420 | 10/16/00 | 80502 | 510 | Purchase/Poss Tobacco |
| 2000315001847 | 11/10/00 | 80502 | 510 | Purchase/Poss Tobacco |
| 2000063000847 | 3/3/00 | 80901 | 940 | Purchase/Poss Tobacco |
| 2000343000850 | 12/8/00 | 91702 | 820 | Purchase/Poss Tobacco |
| 2000156000566 | 6/4/00 | 81901 | 511 | Purchase/Poss Tobacco |
| 2000344000084 | 12/9/00 | 82101 | 511 | Purchase/Poss Tobacco |
| 2000171000581 | 6/19/00 | 70802 | 320 | Purchase/Poss Tobacco |
| 2000291001107 | 10/17/00 | 70405 | 311 | Purchase/Poss Tobacco |
| 2000215001376 | 8/2/00 | 52001 | 430 | Robbery |
| 2000175002267 | 6/23/00 | 52301 | 700 | Robbery |
| 2000091000997 | 3/31/00 | 30402 | 721 | Robbery |
| 2000074000930 | 3/14/00 | 20401 | 200 | Robbery |
| 2000087001525 | 3/27/00 | 21002 | 620 | Robbery |
| 2000132001513 | 5/11/00 | 21401 | 201 | Robbery |

FIG. 36

| Case No. | Date | Subcensus | Patrol Area | Final Event Type |
|---|---|---|---|---|
| 2000132002418 | 5/11/00 | 51501 | 410 | Robbery |
| 2000095000714 | 4/4/00 | 52601 | 601 | Robbery |
| 2000077002401 | 3/17/00 | 21001 | 620 | Robbery |
| 2000331001352 | 11/26/00 | 21001 | 620 | Robbery |
| 2000333002200 | 11/28/00 | 31601 | 611 | Robbery |
| 2000364000073 | 12/29/00 | 52503 | 431 | Robbery |
| 2000161001849 | 6/9/00 | 31401 | 731 | Robbery |
| 2000364001193 | 12/29/00 | 52104 | 600 | Robbery |

FIG. 37

| Zip Code | Ethnicity | White Collar | Blue Collar | Unemployed |
|---|---|---|---|---|
| 22066 | White | 0.033489369 | 0.127971358 | 0.008904672 |
| | African American | 0.000534097 | 0.003186973 | 0.0003432 |
| | Hispanic | 0.000657953 | 0.004132662 | 0.000356032 |
| 22102 | White | 0.029618776 | 0.113180842 | 0.007875499 |
| | African American | 0.000748201 | 0.004464538 | 0.000480779 |
| | Hispanic | 0.001390021 | 0.008730844 | 0.000752169 |
| 22312 | White | 0.018770807 | 0.071728004 | 0.004991073 |
| | African American | 0.005922762 | 0.03534132 | 0.003805853 |
| | Hispanic | 0.005490728 | 0.034487747 | 0.002971146 |
| 22101 | White | 0.032716163 | 0.125016743 | 0.00869908 |
| | African American | 0.000458441 | 0.002735534 | 0.000294586 |
| | Hispanic | 0.000999449 | 0.006277628 | 0.000540823 |
| 20170 | White | 0.025286562 | 0.096626354 | 0.006723582 |
| | African American | 0.002261409 | 0.013493902 | 0.001453138 |
| | Hispanic | 0.004767609 | 0.029945776 | 0.002579852 |
| 20194 | White | 0.032401325 | 0.123813664 | 0.008615366 |
| | African American | 0.001478965 | 0.008825035 | 0.000950354 |
| | Hispanic | 0.001096599 | 0.006887832 | 0.000593392 |
| 20190 | White | 0.027723014 | 0.105936656 | 0.007371424 |
| | African American | 0.002701172 | 0.016117984 | 0.001735721 |
| | Hispanic | 0.003087215 | 0.01939107 | 0.001670556 |
| 22182 | White | 0.030710885 | 0.117354065 | 0.008165885 |
| | African American | 0.00078115 | 0.004661148 | 0.000501952 |
| | Hispanic | 0.000899843 | 0.005651991 | 0.000486923 |
| 22043 | White | 0.027071606 | 0.103447462 | 0.007198218 |
| | African American | 0.001357052 | 0.008097578 | 0.000872016 |
| | Hispanic | 0.003560967 | 0.022366747 | 0.001926913 |
| 22046 | White | 0.032038579 | 0.122427523 | 0.008518913 |
| | African American | 0.000880655 | 0.005254897 | 0.000565892 |
| | Hispanic | 0.002764257 | 0.017362539 | 0.001495796 |

FIG. 39

| Zip Code | Ethnicity | White Collar | Blue Collar | Unemployed |
|---|---|---|---|---|
| 22044 | White | 0.024064671 | 0.091957199 | 0.006398687 |
|  | African American | 0.001398233 | 0.008343302 | 0.000898477 |
|  | Hispanic | 0.007323295 | 0.045998261 | 0.003962786 |
| 22041 | White | 0.019882519 | 0.075976139 | 0.005286672 |
|  | African American | 0.002685009 | 0.016021537 | 0.001725335 |
|  | Hispanic | 0.008619934 | 0.054142568 | 0.004664424 |
| 20171 | White | 0.029180106 | 0.111504571 | 0.007758858 |
|  | African American | 0.001424442 | 0.008499691 | 0.000915319 |
|  | Hispanic | 0.001428734 | 0.008974004 | 0.000773117 |
| 20191 | White | 0.027262003 | 0.104175017 | 0.007248843 |
|  | African American | 0.002815927 | 0.016802729 | 0.00180946 |
|  | Hispanic | 0.003064996 | 0.019251508 | 0.001658532 |
| 22181 | White | 0.032046397 | 0.122457396 | 0.008520992 |
|  | African American | 0.000743729 | 0.004437856 | 0.000477906 |
|  | Hispanic | 0.00166266 | 0.010443314 | 0.0008997 |
| 22180 | White | 0.030047456 | 0.114818936 | 0.007989483 |
|  | African American | 0.00093122 | 0.005556619 | 0.000598384 |
|  | Hispanic | 0.002313098 | 0.014528775 | 0.001251665 |

FIG. 40

| Zip Code | Ethnicity | White Collar | Blue Collar | Unemployed |
|---|---|---|---|---|
| 22027 | White | 0.029093221 | 0.111172564 | 0.007735756 |
| | African American | 0.000819747 | 0.00489146 | 0.000526754 |
| | Hispanic | 0.000797302 | 0.005007923 | 0.000431436 |
| 22042 | White | 0.024033646 | 0.091838646 | 0.006390438 |
| | African American | 0.001307457 | 0.007801642 | 0.000840147 |
| | Hispanic | 0.005687307 | 0.035722477 | 0.003077519 |
| 22312 | White | 0.018770807 | 0.071728004 | 0.004991073 |
| | African American | 0.005922762 | 0.03534132 | 0.003805853 |
| | Hispanic | 0.005490728 | 0.034487747 | 0.002971146 |
| 22310 | White | 0.027519099 | 0.105167445 | 0.007317204 |
| | African American | 0.002979009 | 0.017775848 | 0.001914254 |
| | Hispanic | 0.002508973 | 0.015759079 | 0.001357657 |
| 22303 | White | 0.025707003 | 0.098232967 | 0.006835376 |
| | African American | 0.003827588 | 0.02283935 | 0.002459535 |
| | Hispanic | 0.004323367 | 0.027155447 | 0.002339463 |
| 22307 | White | 0.032910447 | 0.125759148 | 0.008750739 |
| | African American | 0.00185771 | 0.011085017 | 0.001193729 |
| | Hispanic | 0.001912565 | 0.012012987 | 0.001034928 |
| 22308 | White | 0.03609881 | 0.13794269 | 0.00959851 |
| | African American | 0.000672221 | 0.004011166 | 0.000431956 |
| | Hispanic | 0.000658948 | 0.00413891 | 0.00035657 |
| 22306 | White | 0.019495446 | 0.074497036 | 0.005183751 |
| | African American | 0.007329559 | 0.043735724 | 0.004709833 |
| | Hispanic | 0.004944836 | 0.03105895 | 0.002675753 |
| 22309 | White | 0.020898917 | 0.079860052 | 0.005556928 |
| | African American | 0.007606554 | 0.045388563 | 0.004887825 |
| | Hispanic | 0.003692086 | 0.023190316 | 0.001997864 |
| 22315 | White | 0.027801032 | 0.106234782 | 0.007392169 |
| | African American | 0.003564896 | 0.021271853 | 0.002290733 |
| | Hispanic | 0.001681085 | 0.01055904 | 0.00090967 |
| 22060 | White | 0.022395837 | 0.085580164 | 0.005964952 |
| | African American | 0.008192203 | 0.048883152 | 0.005264152 |
| | Hispanic | 0.002477569 | 0.01556183 | 0.001340664 |

FIG. 41

| Zip Code | Ethnicity | White Collar | Blue Collar | Unemployed |
|---|---|---|---|---|
| 22079 | White | 0.020376523 | 0.077863854 | 0.005418025 |
|  | African American | 0.008627406 | 0.051480021 | 0.005543805 |
|  | Hispanic | 0.002366094 | 0.014861646 | 0.001280342 |
| 22039 | White | 0.03270619 | 0.124978633 | 0.008696428 |
|  | African American | 0.001001066 | 0.005973394 | 0.000643266 |
|  | Hispanic | 0.000732611 | 0.004601597 | 0.000396431 |
| 22153 | White | 0.028126155 | 0.107477158 | 0.007478617 |
|  | African American | 0.002591444 | 0.015463231 | 0.001665212 |
|  | Hispanic | 0.001779258 | 0.011175677 | 0.000962793 |
| 22150 | White | 0.022384 | 0.085534931 | 0.005951804 |
|  | African American | 0.001983509 | 0.011835664 | 0.001274565 |
|  | Hispanic | 0.004763144 | 0.029917728 | 0.002577436 |
| 22152 | White | 0.028649363 | 0.109476469 | 0.007617736 |
|  | African American | 0.001559105 | 0.009303232 | 0.001001851 |
|  | Hispanic | 0.002100556 | 0.013193778 | 0.001136654 |
| 22151 | White | 0.027688178 | 0.105803537 | 0.007362161 |
|  | African American | 0.00116824 | 0.006970927 | 0.000750688 |
|  | Hispanic | 0.002456707 | 0.01543079 | 0.001329375 |
| 22003 | White | 0.025543122 | 0.097606735 | 0.006791801 |
|  | African American | 0.001525519 | 0.009102825 | 0.000980269 |
|  | Hispanic | 0.003454592 | 0.021698594 | 0.001869351 |
| 22015 | White | 0.028406733 | 0.108549317 | 0.007553222 |
|  | African American | 0.001321329 | 0.007884416 | 0.000849061 |
|  | Hispanic | 0.002136504 | 0.013419568 | 0.001156106 |
| 22032 | White | 0.030234756 | 0.115534656 | 0.008039285 |
|  | African American | 0.001104404 | 0.006590016 | 0.000709669 |
|  | Hispanic | 0.001408045 | 0.008844056 | 0.000761922 |
| 22030 | White | 0.027802254 | 0.106239453 | 0.007392494 |
|  | African American | 0.002012071 | 0.012006093 | 0.001292918 |
|  | Hispanic | 0.002468331 | 0.015503803 | 0.001335665 |
| 22031 | White | 0.024554371 | 0.093828466 | 0.006528896 |
|  | African American | 0.001467899 | 0.008759001 | 0.000943243 |
|  | Hispanic | 0.003527274 | 0.02215512 | 0.001908681 |

FIG. 42

| Zip Code | Ethnicity | White Collar | Blue Collar | Unemployed |
|---|---|---|---|---|
| 20124 | White | 0.032834812 | 0.12547013 | 0.008730628 |
|  | African American | 0.000761273 | 0.00454254 | 0.000489179 |
|  | Hispanic | 0.000877814 | 0.005513629 | 0.000475003 |
| 20121 | White | 0.025707792 | 0.098235983 | 0.006835586 |
|  | African American | 0.002758497 | 0.016460047 | 0.001772557 |
|  | Hispanic | 0.002596063 | 0.0163061 | 0.001404783 |
| 20120 | White | 0.029557579 | 0.112946993 | 0.007859227 |
|  | African American | 0.001885198 | 0.011249042 | 0.001211392 |
|  | Hispanic | 0.001698829 | 0.010670493 | 0.000919271 |
| 20151 | White | 0.028177439 | 0.107673129 | 0.007492254 |
|  | African American | 0.001426642 | 0.008512823 | 0.000916733 |
|  | Hispanic | 0.002655575 | 0.0166799 | 0.001436986 |
| 20171 | White | 0.029180106 | 0.111504571 | 0.007758858 |
|  | African American | 0.001424442 | 0.008499691 | 0.000915319 |
|  | Hispanic | 0.001428734 | 0.008974004 | 0.000773117 |
| 22033 | White | 0.029279248 | 0.111883418 | 0.00778522 |
|  | African American | 0.001358319 | 0.008105133 | 0.000872829 |
|  | Hispanic | 0.001392399 | 0.008745778 | 0.000753456 |
| 22124 | White | 0.033922931 | 0.129628107 | 0.009019954 |
|  | African American | 0.000806261 | 0.004810984 | 0.000518088 |
|  | Hispanic | 0.001029242 | 0.00646476 | 0.000556944 |
| 22304 | White | 0.021189204 | 0.080969312 | 0.005634113 |
|  | African American | 0.006552356 | 0.03909813 | 0.004210418 |
|  | Hispanic | 0.003820153 | 0.023994717 | 0.002067163 |

FIG. 43

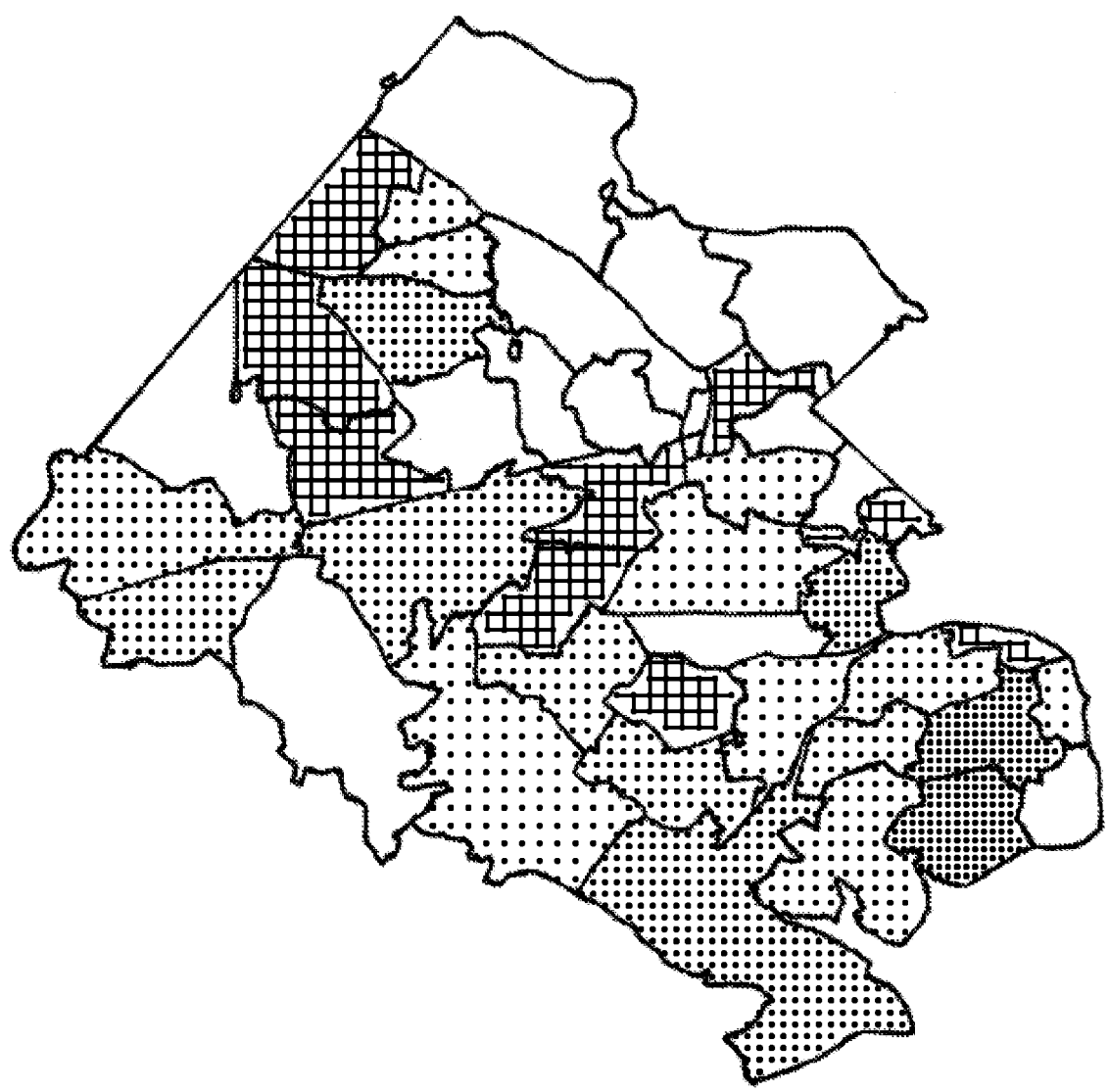
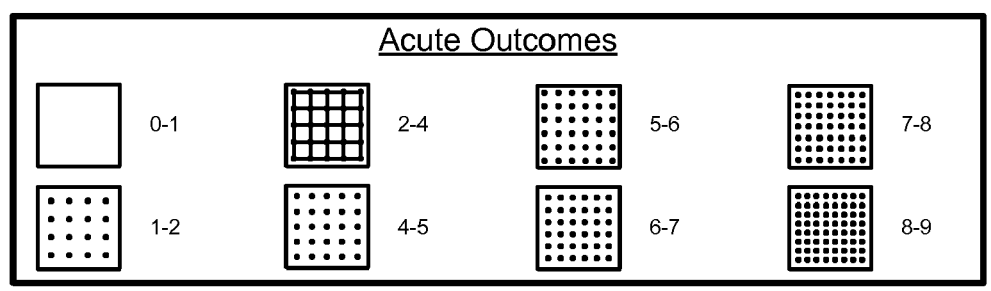
FIG. 45

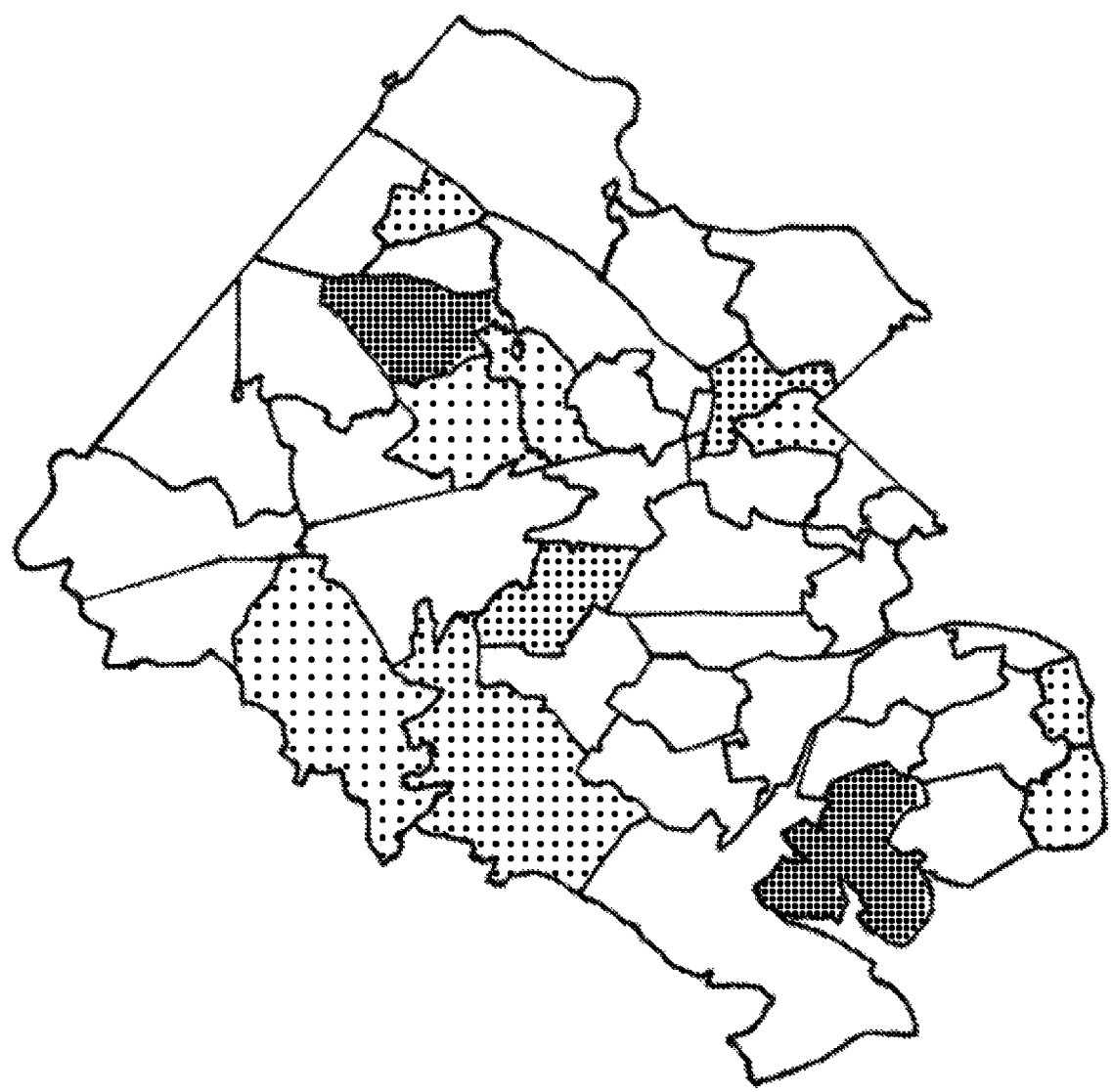
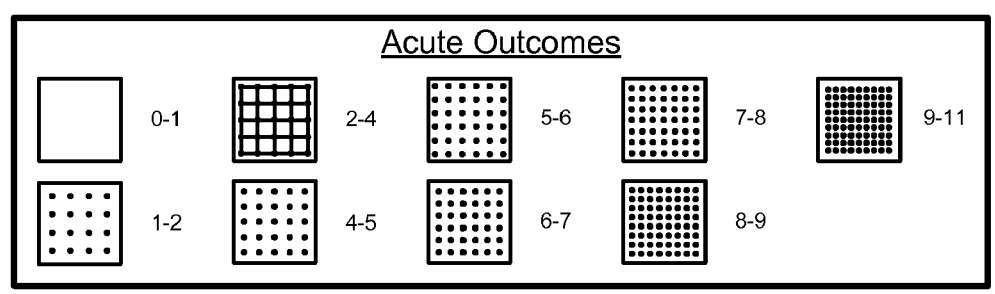
FIG. 46

| Low Availability | Medium Availability | High Availability |
|---|---|---|
| outlet Avail: LOW AVAIL<br>-race: BLACK<br>  -jobClass: WHITE COLLAR<br>    -alcohol Usage: MISUSER<br>      -number of Acute Outcomes = 8<br>        -DWI = 7,<br>        -ASSAULT = 0,<br>        -MURDER = 0,<br>        -SEXUAL_ASSAULT = 0,<br>        -DOMESTIC_VIOLENCE = 0,<br>        -CHILD_ABUSE = 1,<br>        -SUICIDE = 0<br>      -number of Benign Outcomes = 4006,<br>    -alcohol Usage: NONMISUSER<br>      -number of Acute Outcomes = 60<br>        -DWI = 26,<br>        -ASSAULT = 9,<br>        -MURDER = 0,<br>        -SEXUAL_ASSAULT = 1,<br>        -DOMESTIC_VIOLENCE = 8,<br>        -CHILD_ABUSE = 10,<br>        -SUICIDE = 6<br>      -number of Benign Outcomes = 54965,<br>  -jobClass: BLUE COLLAR<br>    -alcohol Usage: MISUSER<br>      -number of Acute Outcomes = 14<br>        -DWI = 8,<br>        -ASSAULT = 0,<br>        -MURDER = 0,<br>        -SEXUAL_ASSAULT = 0,<br>        -DOMESTIC_VIOLENCE = 4,<br>        -CHILD_ABUSE = 1,<br>        -SUICIDE = 1<br>      -number of Benign Outcomes = 9284,<br>    -alcohol Usage: NONMISUSER<br>      -number of Acute Outcomes = 176<br>        -DWI = 91,<br>        -ASSAULT = 15,<br>        -MURDER = 2,<br>        -SEXUAL_ASSAULT = 3,<br>        -DOMESTIC_VIOLENCE = 24,<br>        -CHILD_ABUSE = 34,<br>        -SUICIDE = 7<br>      -number of Benign Outcomes = 123300,<br>  -jobClass: UNEMPLOYED<br>    -alcohol Usage: MISUSER<br>      -number of Acute Outcomes = 1<br>        -DWI = 1,<br>        -ASSAULT = 0,<br>        -MURDER = 0,<br>        -SEXUAL_ASSAULT = 0,<br>        -DOMESTIC_VIOLENCE = 0, | outlet Avail: MED AVAIL<br>-race: BLACK<br>  -jobClass: WHITE COLLAR<br>    -alcohol Usage: MISUSER<br>      -number of Acute Outcomes = 18<br>        -DWI = 11,<br>        -ASSAULT = 1,<br>        -MURDER = 0,<br>        -SEXUAL_ASSAULT = 0,<br>        -DOMESTIC_VIOLENCE = 4,<br>        -CHILD_ABUSE = 0,<br>        -SUICIDE = 2<br>      -number of Benign Outcomes = 8129,<br>    -alcohol Usage: NONMISUSER<br>      -number of Acute Outcomes = 170<br>        -DWI = 84,<br>        -ASSAULT = 18,<br>        -MURDER = 1,<br>        -SEXUAL_ASSAULT = 3,<br>        -DOMESTIC_VIOLENCE = 22,<br>        -CHILD_ABUSE = 29,<br>        -SUICIDE = 13<br>      -number of Benign Outcomes = 109826,<br>  -jobClass: BLUE COLLAR<br>    -alcohol Usage: MISUSER<br>      -number of Acute Outcomes = 22<br>        -DWI = 16,<br>        -ASSAULT = 1,<br>        -MURDER = 1,<br>        -SEXUAL_ASSAULT = 0,<br>        -DOMESTIC_VIOLENCE = 2,<br>        -CHILD_ABUSE = 1,<br>        -SUICIDE = 1<br>      -number of Benign Outcomes = 18354,<br>    -alcohol Usage: NONMISUSER<br>      -number of Acute Outcomes = 326<br>        -DWI = 161,<br>        -ASSAULT = 45,<br>        -MURDER = 2,<br>        -SEXUAL_ASSAULT = 7,<br>        -DOMESTIC_VIOLENCE = 38,<br>        -CHILD_ABUSE = 46,<br>        -SUICIDE = 27<br>      -number of Benign Outcomes = 246391,<br>  -jobClass: UNEMPLOYED<br>    -alcohol Usage: MISUSER<br>      -number of Acute Outcomes = 5<br>        -DWI = 3,<br>        -ASSAULT = 0,<br>        -MURDER = 0,<br>        -SEXUAL_ASSAULT = 0,<br>        -DOMESTIC_VIOLENCE = 0, | outlet Avail: HIGH AVAIL<br>-race: BLACK<br>  -jobClass: WHITE COLLAR<br>    -alcohol Usage: MISUSER<br>      -number of Acute Outcomes = 2<br>        -DWI = 0,<br>        -ASSAULT = 1,<br>        -MURDER = 0,<br>        -SEXUAL_ASSAULT = 0,<br>        -DOMESTIC_VIOLENCE = 0,<br>        -CHILD_ABUSE = 1,<br>        -SUICIDE = 0<br>      -number of Benign Outcomes = 1311,<br>    -alcohol Usage: NONMISUSER<br>      -number of Acute Outcomes = 28<br>        -DWI = 15,<br>        -ASSAULT = 4,<br>        -MURDER = 0,<br>        -SEXUAL_ASSAULT = 0,<br>        -DOMESTIC_VIOLENCE = 3,<br>        -CHILD_ABUSE = 5,<br>        -SUICIDE = 1<br>      -number of Benign Outcomes = 18375,<br>  -jobClass: BLUE COLLAR<br>    -alcohol Usage: MISUSER<br>      -number of Acute Outcomes = 3<br>        -DWI = 1,<br>        -ASSAULT = 1,<br>        -MURDER = 0,<br>        -SEXUAL_ASSAULT = 0,<br>        -DOMESTIC_VIOLENCE = 1,<br>        -CHILD_ABUSE = 0,<br>        -SUICIDE = 0<br>      -number of Benign Outcomes = 3084,<br>    -alcohol Usage: NONMISUSER<br>      -number of Acute Outcomes = 68<br>        -DWI = 32,<br>        -ASSAULT = 11,<br>        -MURDER = 1,<br>        -SEXUAL_ASSAULT = 3,<br>        -DOMESTIC_VIOLENCE = 10,<br>        -CHILD_ABUSE = 6,<br>        -SUICIDE = 5<br>      -number of Benign Outcomes = 41022,<br>  -jobClass: UNEMPLOYED<br>    -alcohol Usage: MISUSER<br>      -number of Acute Outcomes = 0<br>        -DWI = 0,<br>        -ASSAULT = 0,<br>        -MURDER = 0,<br>        -SEXUAL_ASSAULT = 0,<br>        -DOMESTIC_VIOLENCE = 0, |

FIG. 47

| Low Availability | Medium Availability | High Availability |
|---|---|---|
| -CHILD_ABUSE = 0,<br>-SUICIDE = 0<br>-number of Benign Outcomes = 914,<br>-alcohol Usage: NONMISUSER<br>-number of Acute Outcomes = 16<br>-DWI = 6,<br>-ASSAULT = 3,<br>-MURDER = 0,<br>-SEXUAL_ASSAULT = 0,<br>-DOMESTIC_VIOLENCE = 2,<br>-CHILD_ABUSE = 5,<br>-SUICIDE = 0<br>-number of Benign Outcomes = 11528,<br>-race: WHITE<br>-jobClass: WHITE COLLAR<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 538,<br>-alcohol Usage: NONMISUSER<br>-number of Acute Outcomes = 7<br>-DWI = 4,<br>-ASSAULT = 0,<br>-MURDER = 0,<br>-SEXUAL_ASSAULT = 0,<br>-DOMESTIC_VIOLENCE = 2,<br>-CHILD_ABUSE = 0,<br>-SUICIDE = 1<br>-number of Benign Outcomes = 7230,<br>-jobClass: BLUE COLLAR<br>-alcohol Usage: MISUSER<br>-number of Acute Outcomes = 4<br>-DWI = 2,<br>-ASSAULT = 1,<br>-MURDER = 0,<br>-SEXUAL_ASSAULT = 0,<br>-DOMESTIC_VIOLENCE = 1,<br>-CHILD_ABUSE = 0,<br>-SUICIDE = 0<br>-number of Benign Outcomes = 1884,<br>-alcohol Usage: NONMISUSER<br>-number of Acute Outcomes = 40<br>-DWI = 21,<br>-ASSAULT = 1,<br>-MURDER = 1,<br>-SEXUAL_ASSAULT = 1,<br>-DOMESTIC_VIOLENCE = 7,<br>-CHILD_ABUSE = 6,<br>-SUICIDE = 3<br>-number of Benign Outcomes = 25777,<br>-jobClass: UNEMPLOYED<br>-alcohol Usage: MISUSER<br>-number of Acute Outcomes = 0<br>-DWI = 0,<br>-ASSAULT = 0, | -CHILD_ABUSE = 1,<br>-SUICIDE = 1<br>-number of Benign Outcomes = 1657,<br>-alcohol Usage: NONMISUSER<br>-number of Acute Outcomes = 24<br>-DWI = 11,<br>-ASSAULT = 3,<br>-MURDER = 0,<br>-SEXUAL_ASSAULT = 0,<br>-DOMESTIC_VIOLENCE = 3,<br>-CHILD_ABUSE = 6,<br>-SUICIDE = 1<br>-number of Benign Outcomes = 22598,<br>-race: WHITE<br>-jobClass: WHITE COLLAR<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 1082,<br>-alcohol Usage: NONMISUSER<br>-number of Acute Outcomes = 17<br>-DWI = 9,<br>-ASSAULT = 1,<br>-MURDER = 0,<br>-SEXUAL_ASSAULT = 1,<br>-DOMESTIC_VIOLENCE = 3,<br>-CHILD_ABUSE = 2,<br>-SUICIDE = 1<br>-number of Benign Outcomes = 14595,<br>-jobClass: BLUE COLLAR<br>-alcohol Usage: MISUSER<br>-number of Acute Outcomes = 8<br>-DWI = 5,<br>-ASSAULT = 1,<br>-MURDER = 0,<br>-SEXUAL_ASSAULT = 0,<br>-DOMESTIC_VIOLENCE = 1,<br>-CHILD_ABUSE = 0,<br>-SUICIDE = 1<br>-number of Benign Outcomes = 3759,<br>-alcohol Usage: NONMISUSER<br>-number of Acute Outcomes = 80<br>-DWI = 39,<br>-ASSAULT = 9,<br>-MURDER = 0,<br>-SEXUAL_ASSAULT = 4,<br>-DOMESTIC_VIOLENCE = 13,<br>-CHILD_ABUSE = 10,<br>-SUICIDE = 5<br>-number of Benign Outcomes = 50468,<br>-jobClass: UNEMPLOYED<br>-alcohol Usage: MISUSER<br>-number of Acute Outcomes = 1 | -CHILD_ABUSE = 0,<br>-SUICIDE = 0<br>-number of Benign Outcomes = 272,<br>-alcohol Usage: NONMISUSER<br>-number of Acute Outcomes = 6<br>-DWI = 6,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 3838,<br>-race: WHITE<br>-jobClass: WHITE COLLAR<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 174,<br>-alcohol Usage: NONMISUSER<br>-number of Acute Outcomes = 4<br>-DWI = 3,<br>-ASSAULT = 0,<br>-MURDER = 0,<br>-SEXUAL_ASSAULT = 0,<br>-DOMESTIC_VIOLENCE = 0,<br>-CHILD_ABUSE = 1,<br>-SUICIDE = 0<br>-number of Benign Outcomes = 2505,<br>-jobClass: BLUE COLLAR<br>-alcohol Usage: MISUSER<br>-number of Acute Outcomes = 1<br>-DWI = 1,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 561,<br>-alcohol Usage: NONMISUSER<br>-number of Acute Outcomes = 14<br>-DWI = 2,<br>-ASSAULT = 1,<br>-MURDER = 0,<br>-SEXUAL_ASSAULT = 0,<br>-DOMESTIC_VIOLENCE = 3,<br>-CHILD_ABUSE = 6,<br>-SUICIDE = 2<br>-number of Benign Outcomes = 8435,<br>-jobClass: UNEMPLOYED<br>-alcohol Usage: MISUSER<br>-number of Acute Outcomes = 0 |

FIG. 48

| Low Availability | Medium Availability | High Availability |
|---|---|---|
| -MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 276,<br>-alcohol Usage: NONMISUSER<br>-number of Acute Outcomes = 2<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 2,<br>-SUICIDE = 0<br>-number of Benign Outcomes = 3590,<br>-race: HISPANIC<br>-jobClass: WHITE COLLAR<br>-alcohol Usage: MISUSER<br>-number of Acute Outcomes = 3<br>-DWI = 2,<br>-ASSAULT = 1,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 585,<br>-alcohol Usage: NONMISUSER<br>-number of Acute Outcomes = 9<br>-DWI = 5,<br>-ASSAULT = 2,<br>-MURDER = 0,<br>-SEXUAL_ASSAULT = 1,<br>-DOMESTIC_VIOLENCE = 0,<br>-CHILD_ABUSE = 1,<br>-SUICIDE = 0<br>-number of Benign Outcomes = 7432,<br>-jobClass: BLUE COLLAR<br>-alcohol Usage: MISUSER<br>-number of Acute Outcomes = 1<br>-DWI = 1,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 2134,<br>-alcohol Usage: NONMISUSER<br>-number of Acute Outcomes = 49<br>-DWI = 24,<br>-ASSAULT = 4,<br>-MURDER = 0,<br>-SEXUAL_ASSAULT = 1,<br>-DOMESTIC_VIOLENCE = 9,<br>-CHILD_ABUSE = 4,<br>-SUICIDE = 7<br>-number of Benign Outcomes = 26315,<br>-jobClass: UNEMPLOYED<br>-alcohol Usage: MISUSER | -DWI = 1,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 533,<br>-alcohol Usage: NONMISUSER<br>-number of Acute Outcomes = 11<br>-DWI = 6,<br>-ASSAULT = 0,<br>-MURDER = 0,<br>-SEXUAL_ASSAULT = 0,<br>-DOMESTIC_VIOLENCE = 3,<br>-CHILD_ABUSE = 2,<br>-SUICIDE = 0<br>-number of Benign Outcomes = 7300,<br>-race: HISPANIC<br>-jobClass: WHITE COLLAR<br>-alcohol Usage: MISUSER<br>-number of Acute Outcomes = 4<br>-DWI = 2,<br>-ASSAULT = 1,<br>-MURDER = 0,<br>-SEXUAL_ASSAULT = 0,<br>-DOMESTIC_VIOLENCE = 0,<br>-CHILD_ABUSE = 1,<br>-SUICIDE = 0<br>-number of Benign Outcomes = 1142,<br>-alcohol Usage: NONMISUSER<br>-number of Acute Outcomes = 16<br>-DWI = 11,<br>-ASSAULT = 0,<br>-MURDER = 0,<br>-SEXUAL_ASSAULT = 1,<br>-DOMESTIC_VIOLENCE = 0,<br>-CHILD_ABUSE = 2,<br>-SUICIDE = 2<br>-number of Benign Outcomes = 14890,<br>-jobClass: BLUE COLLAR<br>-alcohol Usage: MISUSER<br>-number of Acute Outcomes = 5<br>-DWI = 4,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 1<br>-number of Benign Outcomes = 4359,<br>-alcohol Usage: NONMISUSER<br>-number of Acute Outcomes = 99<br>-DWI = 57,<br>-ASSAULT = 6,<br>-MURDER = 0,<br>-SEXUAL_ASSAULT = 1,<br>-DOMESTIC_VIOLENCE = 9,<br>-CHILD_ABUSE = 21,<br>-SUICIDE = 5<br>-number of Benign Outcomes = | -DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 83,<br>-alcohol Usage: NONMISUSER<br>-number of Acute Outcomes = 1<br>-DWI = 0,<br>-ASSAULT = 0,<br>-MURDER = 0,<br>-SEXUAL_ASSAULT = 0,<br>-DOMESTIC_VIOLENCE = 1,<br>-CHILD_ABUSE = 0,<br>-SUICIDE = 0<br>-number of Benign Outcomes = 1186,<br>-race: HISPANIC<br>-jobClass: WHITE COLLAR<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 189,<br>-alcohol Usage: NONMISUSER<br>-number of Acute Outcomes = 2<br>-DWI = 1,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 1<br>-number of Benign Outcomes = 2406,<br>-jobClass: BLUE COLLAR<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 740,<br>-alcohol Usage: NONMISUSER<br>-number of Acute Outcomes = 15<br>-DWI = 7,<br>-ASSAULT = 0,<br>-MURDER = 0,<br>-SEXUAL_ASSAULT = 1,<br>-DOMESTIC_VIOLENCE = 0,<br>-CHILD_ABUSE = 5,<br>-SUICIDE = 2<br>-number of Benign Outcomes = |

FIG. 49

| Low Availability | Medium Availability | High Availability |
| --- | --- | --- |
| -number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 210,<br>-alcohol Usage: NONMISUSER<br>-number of Acute Outcomes = 2<br>-DWI = 0,<br>-ASSAULT = 1,<br>-MURDER = 0,<br>-SEXUAL_ASSAULT = 0,<br>-DOMESTIC_VIOLENCE = 1,<br>-CHILD_ABUSE = 0,<br>-SUICIDE = 0<br>-number of Benign Outcomes = 3077<br>} | 57277,<br>-jobClass: UNEMPLOYED<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 457,<br>-alcohol Usage: NONMISUSER<br>-number of Acute Outcomes = 8<br>-DWI = 3,<br>-ASSAULT = 0,<br>-MURDER = 0,<br>-SEXUAL_ASSAULT = 0,<br>-DOMESTIC_VIOLENCE = 3,<br>-CHILD_ABUSE = 2,<br>-SUICIDE = 0<br>-number of Benign Outcomes = 8156<br>} | 9521,<br>-jobClass: UNEMPLOYED<br>-alcohol Usage: MISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 78,<br>-alcohol Usage: NONMISUSER<br>-number of Acute Outcomes = 0<br>-DWI = 0,<br>-ASSAULT = 0,<br>-MURDER = 0,<br>-SEXUAL_ASSAULT = 0,<br>-DOMESTIC_VIOLENCE = 0,<br>-CHILD_ABUSE = 0,<br>-SUICIDE = 0<br>-number of Benign Outcomes = 1024<br>} |

FIG. 50

POLICY ANALYSIS AND ACTION DECISION TOOL

GOVERNMENT LICENSE RIGHTS TO CONTRACTOR-OWNED INVENTIONS MADE UNDER FEDERALLY SPONSORED RESEARCH AND DEVELOPMENT

This invention was made with government support under Grant No. IF32AA015876-01A1 awarded by the National Institute on Alcohol Abuse and Alcoholism of the National Institutes of Health. The government has certain rights in the invention.

CROSS REFERENCE TO RELATED APPLICATIONS

The present application claims the benefit of provisional patent application Ser. No. 60/776,680 to Said et al., filed on Feb. 27, 2006, entitled "Graph-Theoretic Policy Decision Tool," which is hereby incorporated by reference.

BRIEF DESCRIPTION OF THE DRAWINGS

FIG. 10 shows an example of an adjacency matrix summarizing connectivity strengths in the alcohol users directed graph.

FIG. 13 shows zip codes and percentages within Fairfax County, Va.

FIG. 14 shows a continuation of zip codes and percentages within Fairfax County, Va.

FIG. 15 shows zip code population and demographic information for Fairfax County, Va.

FIG. 16 shows a continuation of zip code population and demographic information for Fairfax County, Va.

FIG. 17 shows the alcohol seller (Virginia's ABC stores), gallons of alcohol sold and gross sale figures in dollars.

FIG. 18 shows alcohol establishment license information and status for Fairfax County, Va.

FIG. 19 shows a continuation of alcohol establishment license information and status for Fairfax County, Va.

FIG. 20 shows a low amount of alcohol availability outlets in Fairfax County, Va.

FIG. 21 shows a medium amount of alcohol availability outlets in Fairfax County, Va.

FIG. 22 shows a high amount of alcohol availability outlets in Fairfax County, Va.

FIG. 23 shows leading causes of death in Va.

FIG. 24 shows a continuation of leading causes of death in VA.

FIG. 25 shows a continuation of leading causes of death in VA.

FIG. 26 shows a continuation of leading causes of death in VA, with Fairfax County noted.

FIG. 27 shows resident alcohol induced deaths by race and sex as underlying causes of death in the year 2000 in VA.

FIG. 28 shows resident alcohol induced deaths by zip code and race/sex in the year 2000 in Fairfax County, Va.

FIG. 29 shows a sample of motor vehicle crashes.

FIG. 30 shows a continuation of motor vehicle crashes.

FIG. 31 shows a sample of crime statistics.

FIG. 32 shows a continuation of the sample of crime statistics.

FIG. 33 shows a continuation of the sample of crime statistics.

FIG. 34 shows a continuation of the sample of crime statistics.

FIG. 35 shows a continuation of the sample of crime statistics.

FIG. 36 shows a continuation of the sample of crime statistics.

FIG. 37 shows a continuation of the sample of crime statistics.

FIG. 39 shows examples of conditional probability of being an alcohol misuser given ethnicity, job class and zip code in Fairfax County, Va.

FIG. 40 shows a continuation of examples of conditional probability of being an alcohol misuser given ethnicity, job class and zip code in Fairfax County, Va.

FIG. 41 shows a continuation of examples of conditional probability of being an alcohol misuser given ethnicity, job class and zip code in Fairfax County, Va.

FIG. 42 shows a continuation of examples of conditional probability of being an alcohol misuser given ethnicity, job class and zip code in Fairfax County, Va.

FIG. 43 shows a continuation of examples of conditional probability of being an alcohol misuser given ethnicity, job class and zip code in Fairfax County, Va.

FIG. 45 shows an example of Fairfax County, Va. with the intensity and representative scale of acute outcomes with probabilities based on actual data.

FIG. 46 shows an example of Fairfax County, Va. with a rerun simulation with modifications showing only low outlet availability in each zip code.

FIG. 47 shows an example of detailed output from the alcohol tree simulator.

FIG. 48 shows a continuation of an example of detailed output from the alcohol tree simulator.

FIG. 49 shows a continuation of an example of detailed output from the alcohol tree simulator.

FIG. 50 shows a continuation of an example of detailed output from the alcohol tree simulator.

DETAILED DESCRIPTION OF THE INVENTION

Figure 1:
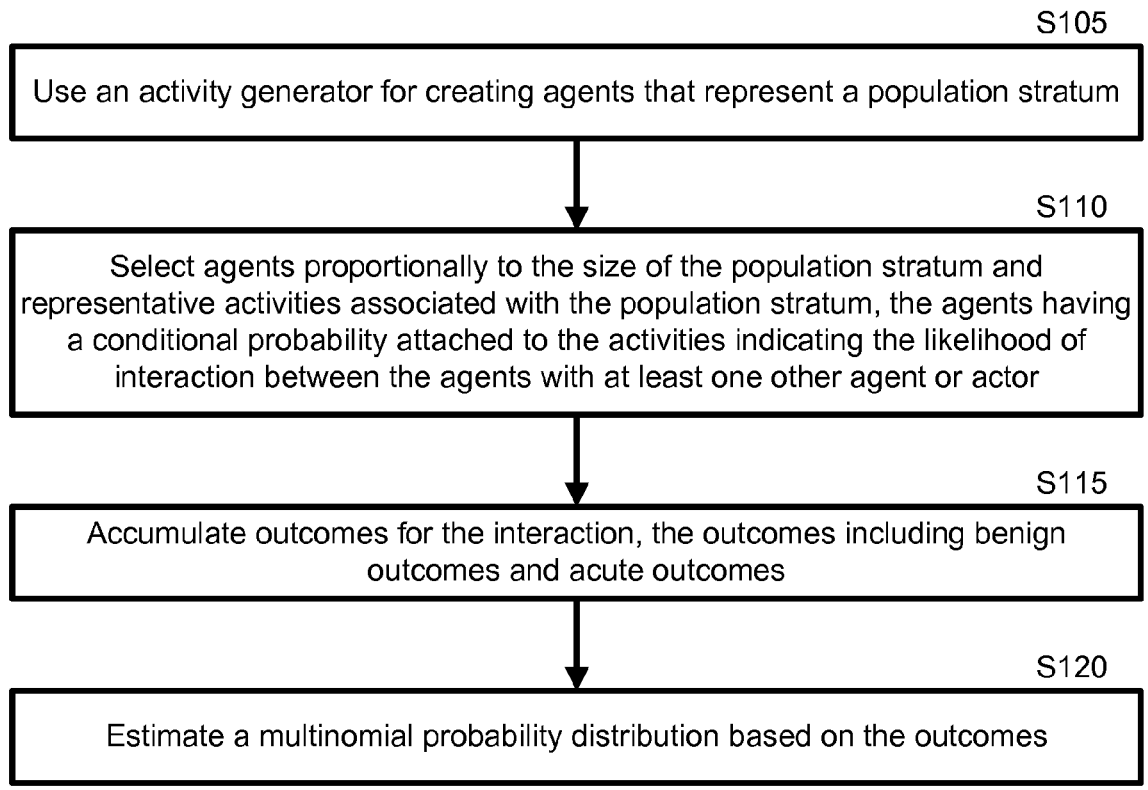
FIG. 1 shows an example of a flow diagram for creating a social network stochastic directed graph model based on a stochastic directed graph.

The claimed invention relates to an updatable social network stochastic directed graph model that may be embodied as systems, methods and/or computer program products (e.g., software, interactive webpages, etc.). In particular, the social network stochastic directed graph model may utilize one or more stochastic directed graphs to help formulate public policy.

I. INTRODUCTION

Alcohol is legally sold in the United States without a prescription to those who are twenty-one years and older. Also referred to as ethanol or ethyl alcohol, alcohol can create a euphoric sense in low amounts that often seduces the user (e.g., consumer) into consuming higher dosages. At higher dosage levels, alcohol is a depressant that suppresses both cognitive and/or motor functions in the brain. With respect to cognitive functions, a suppression result is impairment of judgment. With respect to motor functions, a suppression result is weakened ability to react to stimuli. Both may lead to a range of acute alcohol-related outcomes (also referred to herein as acute outcomes). An acute outcome is defined as any decision or action taken by a user, or one or more consequences resulting from the decisions or actions of a user. Nonlimiting examples of acute outcomes include assault, suicide, sexual assault, murder, domestic violence, child abuse, automobile accidents caused by driving under the influence (DUI) or driving while intoxicated (DWI) (including fatal accidents either from DUI or DWI), alcohol induced sexually transmittal diseases, etc. At extremely high dosages, alcohol may even lead to death. According to the 2002 American Heritage Stedman's Medical Dictionary, lethal dose 50 (LD50) for alcohol occurs at 0.35 Blood Alcohol Concentration (BAC).

It is well known that LD50 is that dosage of a substance that causes ½ the exposed population to die. Such dosage can be for any medication, such as chemotherapy drugs, a toxic poison (e.g., ricin, etc.), drugs (e.g., alcohol, heroin, etc.), everyday substances (e.g., drain cleaner, etc.). LD30, by analogy, would cause 30% of the exposed population to die.

Interventions that mitigate the undesirable acute outcomes need to be explored. However, they are often based on an incomplete understanding to the alcohol usage. In general, the study of alcohol usage and its effects can be addressed at different scales. The broadest understanding comes from studying the societal dynamics surrounding alcohol use.

The alcohol system of the present invention typically involves complex temporal and spatial interactions among a multitude of people. These include users (such as causal drinkers, heavy users/alcohol abusers, binge drinkers, under aged or young drinkers, alcoholics, etc.), family members and peers' of users, non-users, alcohol producers and distributors, law enforcement, courts, prevention activities and treatment centers. Additionally, the alcohol system may be understood in terms of sub-populations and geo-spatial interactions among diverse communities. Analogously, understanding the alcohol system involves many, if not most or all, of the same or similar issues, as well as the same or equivalent level, of complexity that ecologists face in understanding conventional or classical ecological systems. Classical ecological systems may be defined as a collection of multiple organisms, their environment, their relationships and their interactions.

Because the consequences of alcohol misuse tend to be severe, including violence and/or life threatening situations, for individuals and society, a tool that provides policy insights into the effectiveness of interventions is needed.

II. SOCIAL NETWORK STOCHASTIC DIRECTED GRAPH MODEL

Based on the concept of a stochastic directed graph (also referred to herein as directed graph or digraph), the present invention can be used as a simulation model to represent any social network order or policy. For instance, the model can apply to sales, distribution and/or consumption of alcohol. Other nonlimiting examples of social networks in which the model may be applied include drugs (e.g., illegal substances, over-the-counter drugs, prescription drugs, etc.), tobacco, banks and similar financial institutions, gas stations, food vendors, retail stores, wholesale stores, sporting events, concerts, diseases and/or other medical-related issues, healthcare, homeland security, elections, etc.

Referring to FIGS. 1-7, the present invention may be embodied in the form of a physical or tangible computer-readable medium (e.g., computer program product, etc.), system or apparatus.

The tangible computer readable medium may be encoded with instructions for creating a social network stochastic directed graph model computer program that are executable by an instruction execution system.

Examples of tangible computer readable mediums include, but are not limited to, a compact disc (cd), digital versatile disc (dvd), usb flash drive, floppy disk, random access memory (RAM), read-only memory (ROM), erasable programmable read-only memory (EPROM), optical fiber, etc.

The instructions may be written using any computer language or format. Nonlimiting examples of computer languages include Ada, Ajax, C++, Cobol, Java, Python, XML, etc.

The instruction execution system may be any apparatus (such as a computer or processor) or "other device" that is configured or configurable to execute embedded instructions. Examples of "other device" include, but are not limited to, PDA, cd player/drive, dvd player/drive, cell phone, etc.

Figure 2:
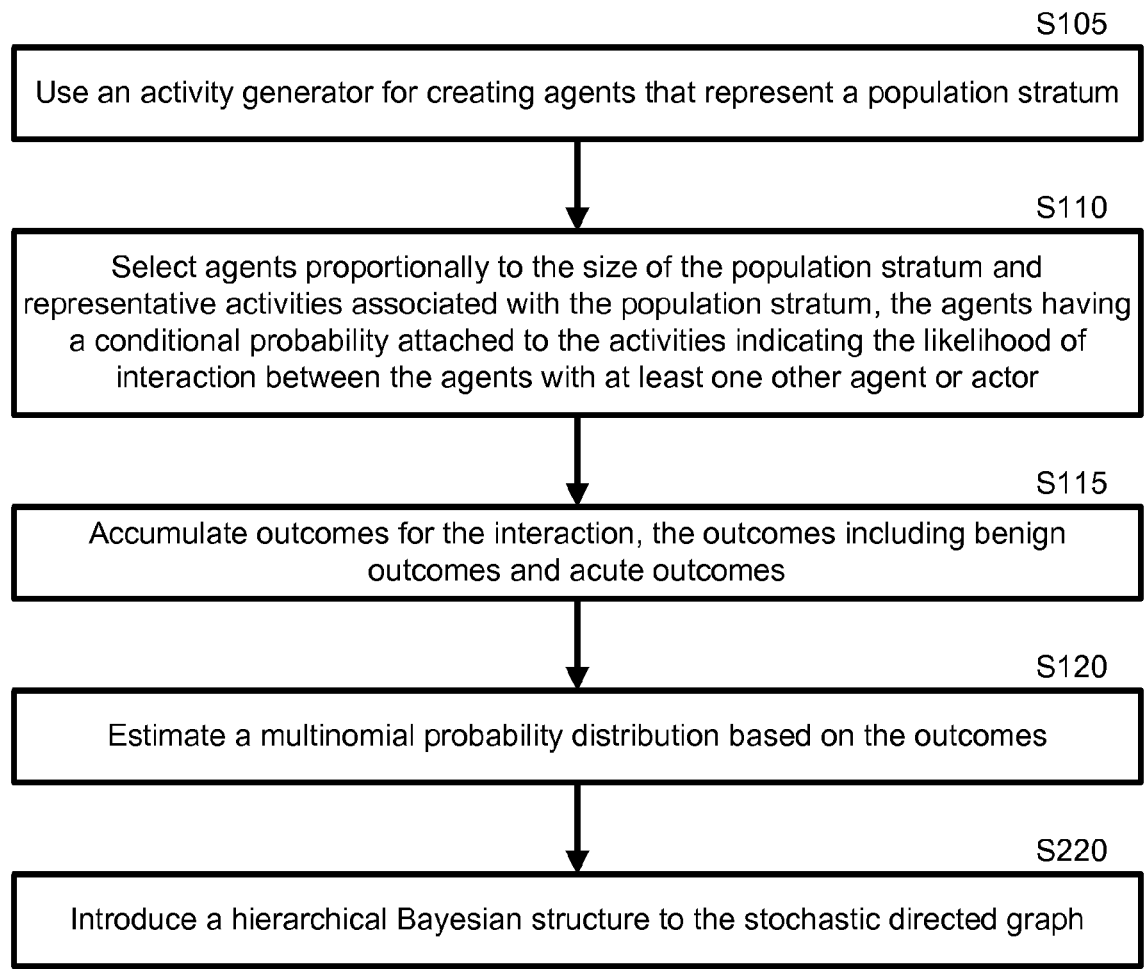
FIG. 2 shows another example of a flow diagram for creating a social network stochastic directed graph model based on a stochastic directed graph.
Figure 3:
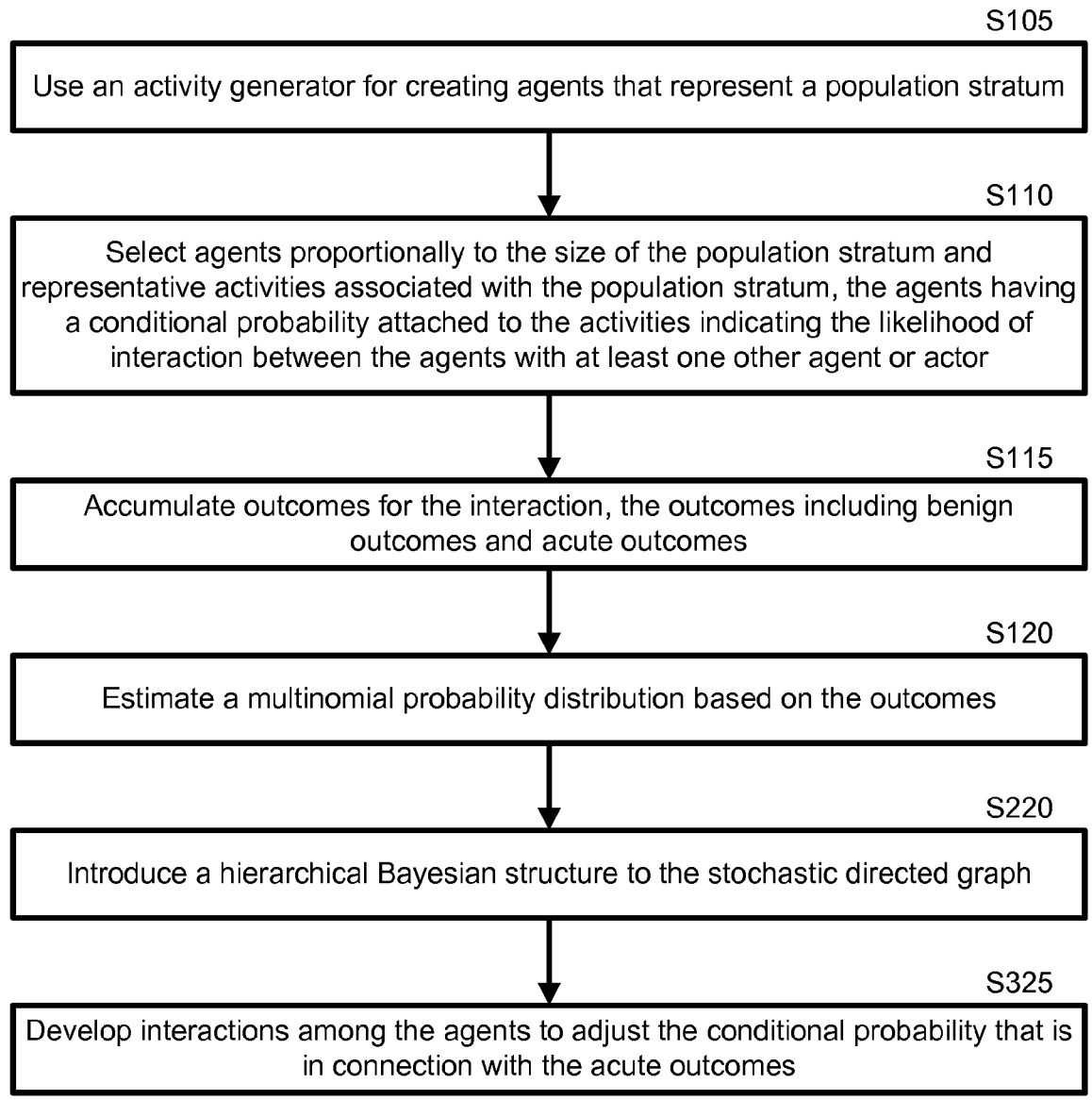
FIG. 3 shows another example of a flow diagram for creating a social network stochastic directed graph model based on a stochastic directed graph.

The physical or tangible computer-readable medium may be encoded with instructions for creating a social network stochastic directed graph model. As illustrated in FIGS. 1-3, upon execution of the "social network stochastic directed graph model," one or more processors may use an activity generator for creating agents that represent a population stratum S105; proportionally select agents according to the size of the population stratum and according to representative activities associated with the population stratum S110; accumulate outcomes for each interaction S115; and estimate a multinomial probability distribution based on the outcomes S120. An agent may be an organism, person or organization. Agents may have one or more conditional probabilities attached to the activities, which tends to indicate the likelihood of an interaction between the agents with at least one other agent or actor. Actor is defined as another agent, group of agents or institution. The outcomes may include benign outcomes and acute outcomes.

Figure 4:
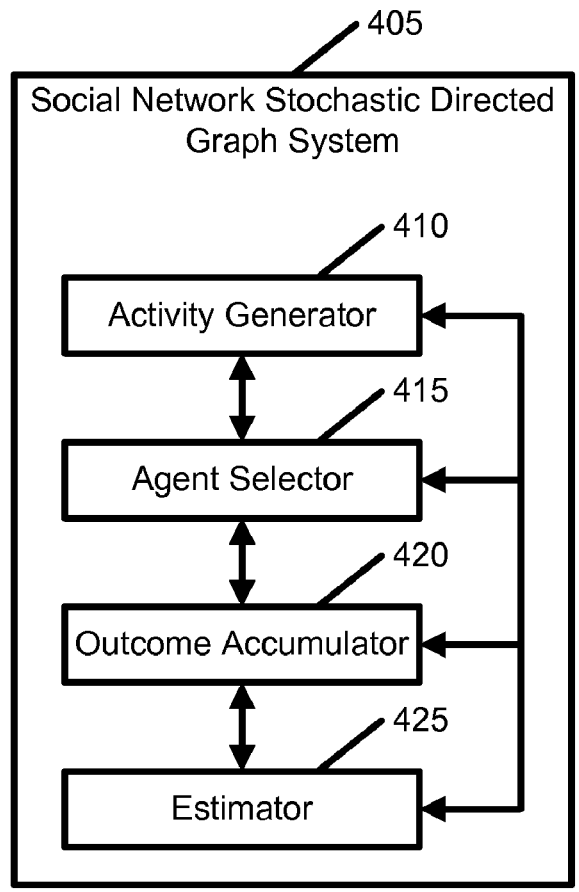
FIG. 4 shows an example of a block diagram of a social network stochastic directed graph system.
Figure 5:
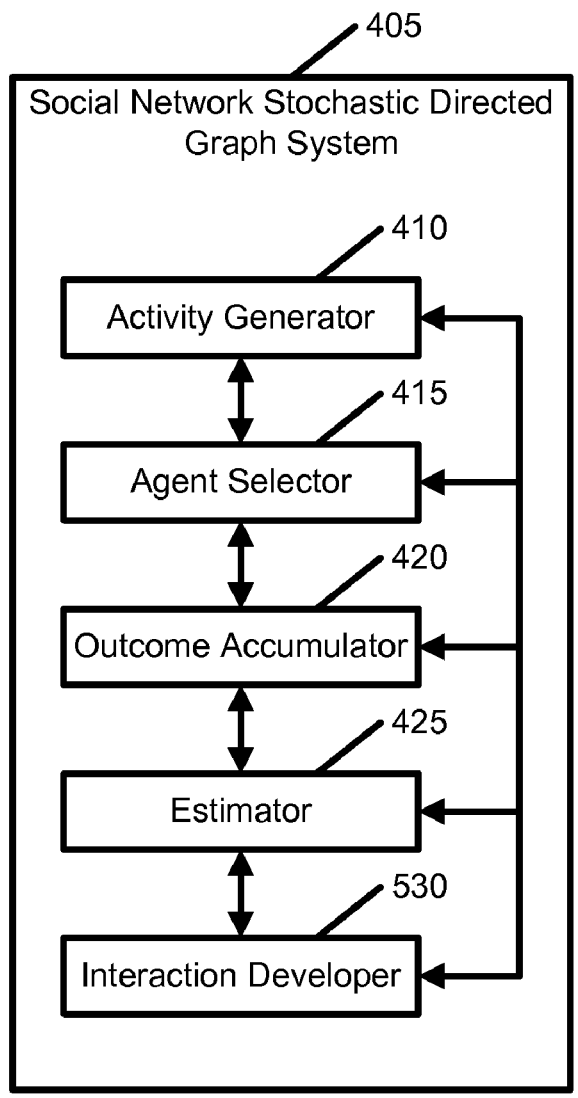
FIG. 5 shows another example of a block diagram of a social network stochastic directed graph system.

Referring to FIGS. 4-5, as a social network stochastic directed graph system 405 using one or more stochastic directed graphs for formulating public policy, the present invention includes an activity generator 410, an agent selector 415, an outcome accumulator 420 and an estimator 425. It may even further include an interaction developer 530.

Figure 6:
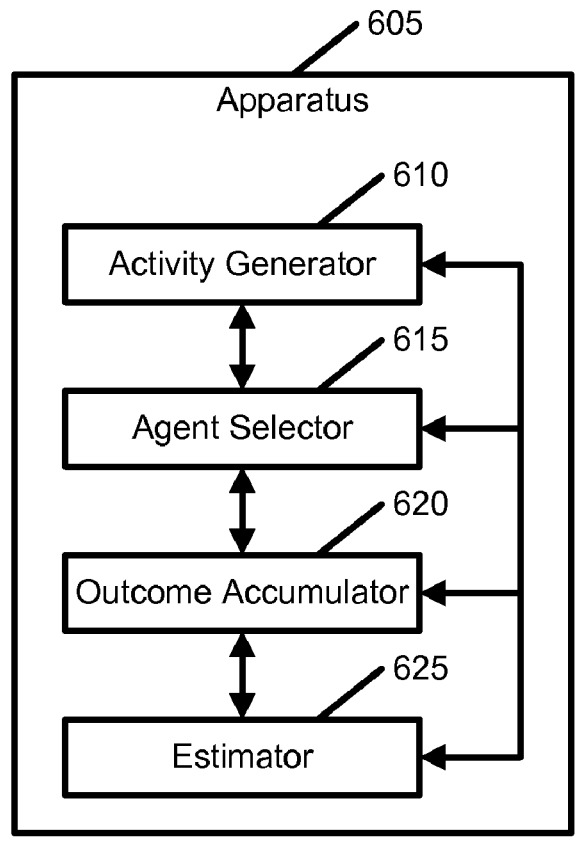
FIG. 6 shows an example of a block diagram of an apparatus.
Figure 7:
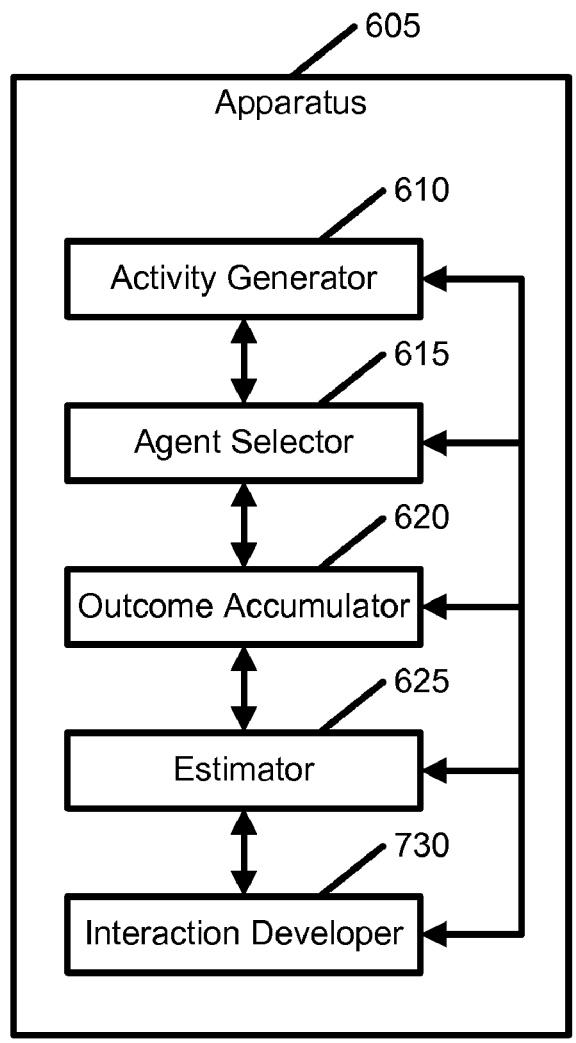
FIG. 7 shows another example of a block diagram of an apparatus.

Referring to FIGS. 6-7, as an apparatus 605 for generating a social network stochastic directed graph, the present invention may similarly include an activity generator 610, an agent selector 615, an outcome accumulator 620 and an estimator 625. It may even further include an interaction developer 730. The apparatus 605 may be a stand-alone, hand-held and/or portable device.

Activity generator 410, 610 may be configured for creating agents that represent a population stratum. Agent selector 415, 615 may be configured for proportionally selecting agents to the size of the population stratum and the representative activities associated with the population stratum. The agents may have one or more conditional probabilities attached to the activities. Each conditional probability may indicate the likelihood of interaction(s) between agents and at least one other agent or actor. Outcome accumulator 420, 620 may be configured for accumulating outcomes for each interaction. Outcomes may include benign outcomes and acute outcomes. Estimator 425, 625 may be configured for estimating a multinomial probability distribution based on the outcomes.

Where an interaction developer 530, 730 is included, it may be configured for developing interactions among the agents to adjust any conditional probability that is in connection with acute outcomes.

As another embodiment of the present invention, a hierarchical Bayesian structure may be introduced to the stochastic directed graph S220. A purpose of such introduction is to allow one to vary the probability distribution. Moreover, the hierarchical Bayesian structure may increase the richness of the possible behaviors for agents from a given cluster or class.

As another embodiment of the present invention, vertices of the stochastic directed graph represent the state of the agents. This representation entails the current state of the agent, not the agent itself.

As another embodiment of the present invention, edges of the stochastic directed graph represent at least one decision that takes the agents from one state into another state. This transitioning between states may be iterative. Hence, multiple states may be involved.

As another embodiment of the present invention, one or more conditional probabilities may be attached to the edges. It is possible that the social network stochastic directed graph model is asymmetric. For example, an agent may be associated with one police officer. However, the same police officer may be related to multiple actors. It is also possible that the social network stochastic directed graph model is symmetric. For instance, where one agent is associated with a police officer, that same police officer is associated with one agent or actor.

Figure 8:
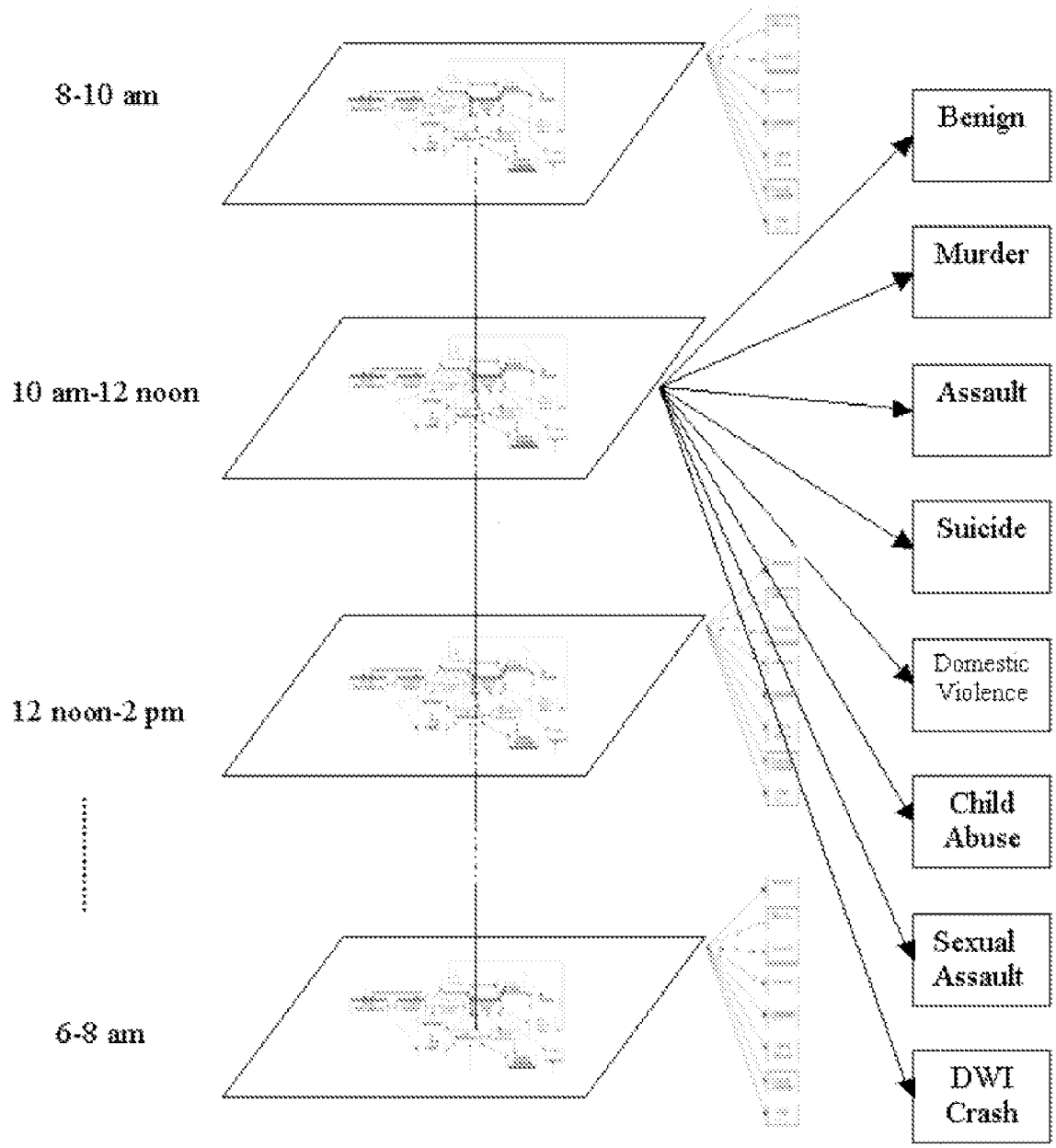
FIG. 8 shows an example of a time of day stochastic directed graph with acute outcomes.

As another embodiment of the present invention, the stochastic directed graph may be time dependent. Time can either be continuous or discrete. Because the present invention often involves one or more levels/layers of social networks, the probability of interactions may change over time. Given various factors affecting agents, such as behavioral and/or societal influences or catalysts, over a span of time (e.g., day, week, month, year, etc.), such change is likely to occur even if the same social network exists at each level or layer. As exemplified in FIG. 8, a time-dependent stochastic directed graph shows a social network and its evolution throughout the time of day and week, as well as acute outcomes.

As another embodiment of the present invention, each of the agents may be a member of a class. The class may be homogenous. Agents may be aggregated into relatively homogenous classes of similarly behaving agents. As an example, agents who have been arrested under DWI charges can be aggregated into certain prevalent classes of drinking behaviors.

The present invention allows for multiple agents and multiple classes. For example, there may be 30 agents per class, and there may be 15 classes. In general, the agent should be unique; the classes should be mutually exclusive. Examples of classes include, but are not limited to, race/ethnicity, income level, education, gender, age, job, etc. In essence, an agent in a particular class may be a White male, blue collar worker and a misuser. An agent in another class may be a Hispanic female, white collar worker and an alcoholic user.

The overall concept is that relatively homogenous clusters or classes of people are identified along with their daily activities. In the parlance of social networks, agents generally represent people, whether individually or as an organization. They may also represent organisms, other living things and can even be nonliving things. The activities are characterized by different states in the directed graph. States can refer to a multitude of factors that describe the status or situation of an agent. Factors include, but are not limited to, physical location, present activity, behavior, physical or mental conditions, blood alcohol content (BAC) level, etc. Decisions resulting from an agent's actions move the agent from state to state within the directed graph. The leaf nodes in the directed graph represent a variety of outcomes, some of which are benign and some of which are acute alcohol-related outcomes. A benign outcome is defined as an outcome that is not an acute outcome. The agents have probabilities associated with their transit from state to state through the directed graph. As agents are introduced into the directed graph model, their outcomes, whether benign or acute, accumulate so that a multinomial probability distribution can be estimated. An ultimate goal is to create a tool that will be useful for public policy formulation by allowing an analyst to investigate potential effects of interventions.

A two-part strategy may be implemented. The first part of the strategy involves the technical level. As another embodiment of the present invention, the conditional probability is adjustable. By allowing one to change conditional probabilities, the structure of the directed graph may reveal how those adjustments affect the probability distribution over outcomes. In other words, one can see how agents and/or actors interact. It is possible that an intervention may reduce the incidence of one acute outcome, but increase the incidence of other acute outcome(s). For example, increasing police patrols at off-license areas selling alcohol may reduce assaults against sellers. However, as a consequence, the occurrence of DWIs and domestic violence may increase because users making alcoholic purchases at these off-license locations often consume the purchased alcohol elsewhere.

The second part of the strategy, as another embodiment of the present invention, involves developing interactions among agents to adjust any conditional probability that is in connection with one or more acute outcomes. Developing interactions may be achieved using an interaction developer S325. This aspect can generally be referred to the basis for the policy tool. The ability to adjust the probabilities can allow one to see the intervention(s) and different combinations of interventions and to determine or achieve probability adjustments leading to a favorable reduction in the probabilities associated with acute outcomes. For instance, focusing on reductions of drinking behaviors within certain populations or certain geographic regions may reduce the overall probability of acute outcomes. In essence, the policy system as a whole in order to evaluate the best interventions for reducing overall incidences of acute outcomes. As a policy tool, this study will be helpful because current non-systematic approaches tend to yield very limited capabilities.

As another embodiment of the present invention, the structure of the stochastic directed graph and the conditional probability is based on collected data. Collected data includes, but is not limited to, surveyed data, census data, administrative record data, national data, state data, local data, expert opinion and any combination thereof.

As another embodiment, the present invention may also be applied to any geographical area. For example, it may apply to a specific city or town (e.g., New York, N.Y., Los Angeles, Calif., Washington, D.C., Chicago, Ill., Miami, Fla., etc.), county (e.g., Fairfax County, Va., Dallas County, Tex., Wayne County, Mich., San Francisco County, Wyandotte County, Kans., etc.), state (e.g., MO, IA, OH, ID, NH, etc.), or even the entire nation.

Figure 9:
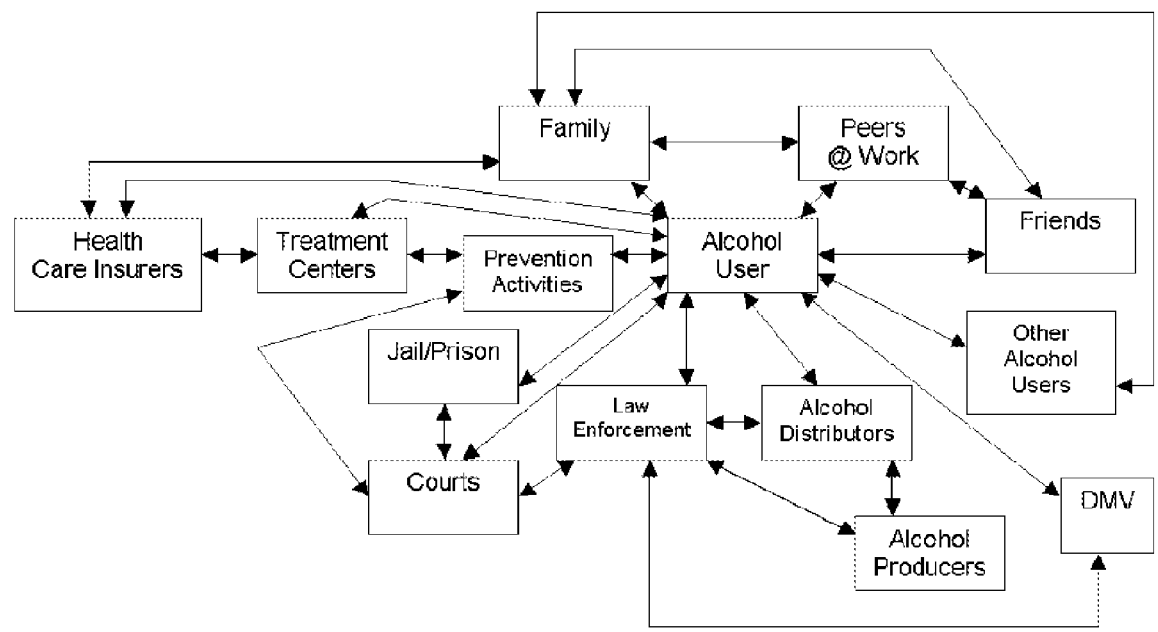
FIG. 9 shows an example of a social network for an alcohol user.

The example described below throughout indicates how the present invention may involve agents from diverse communities that representing a comprehensive view of an alcohol system. FIG. 9 shows an example of a social network for an alcohol user. This same network in this figure may also apply to non-alcohol users with some edges removed.

Furthermore, the alcohol example described below may also offer a dynamic, simulation view of the system with simultaneous assessment of a variety of acute outcomes. FIG. 10 shows an example of an adjacency matrix summarizing strengths of connectivity in the alcohol users digraph. The x's are place holders for numerical probability values. In this figure, there is a general symmetry, but the bidirectional probabilities between any two nodes are likely to be unequal.

This approach may incorporate not only factors, such as geographic distribution and operating hours of alcohol outlets (e.g., bars, state liquor stores, grocery and convenience stores that sell beer and wine, restaurants, etc.), but also mobility information. Intervention procedures can be assessed by altering group-specific probability structures. Nonlimiting examples of intervention procedures include changes in alcohol service and distribution policies, law enforcement procedures, judicial sentencing policies, taxing policies and other government legislation. As an aspect, the present invention allows for simultaneous assessment of the effect of interventions on the probability distributions of acute outcomes with a dynamic simulation model.

The selected target experimental site for the example is Fairfax County of Northern Virginia. There are several reasons for such a selection. There are readily identifiable subpopulations within Fairfax County, including subpopulations that exhibit problem drinking behaviors. These include, inter alia, university and high school age populations, military populations, white-collar and blue-collar workers, and significant immigrant communities. In addition, there is significant local expertise in alcohol studies and access to data on alcohol use in this geographic region from public records and from alcohol related surveys. For instance, local experts may have access to, and experience with, the Virginia Department of Alcoholic Beverage Control, the Virginia Alcohol Safety Action Program, and other remediation and treatment programs.

It should be noted that in no way does this present invention limit the policy tool to the above selected alcohol system or target experimental site. Rather, using Fairfax County of Northern Virginia as an example shows how the policy tool can be implemented. It is within the scope of the present invention that the policy tool be implementable in all geographical capacities, whether or not such geographical capacities have less, more or an equivalent amount of collectable data.

III. STOCHASTIC DIRECTED GRAPHS

Figure 11:
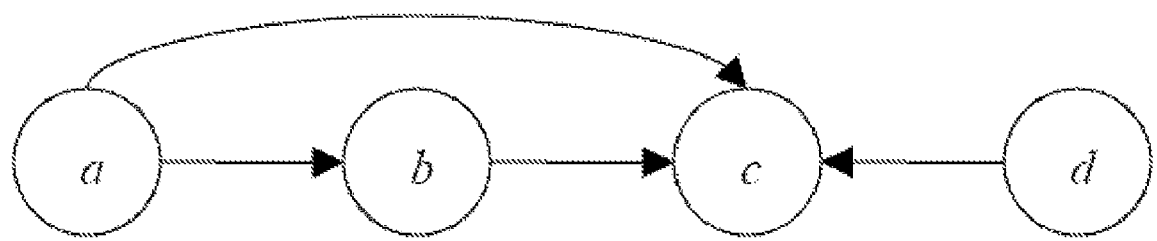
FIG. 11 shows a simple digraph with four vertices and four directed edges.

A directed graph G is a pair (V, E) where V is a set of elements called vertices or nodes, and E is a subset of the set of all ordered pairs (a, b), where a and b are vertices. An element of E is called an edge or an arc of G. The pair (a, b) is not the same as the pair (b, a). Typically, the direction of the edge (a, b) may be regarded as flowing from a to b. Conventionally, an edge of the digraph can be represented as two points representing a and b with an arrow whose tail is at a and whose head is at b. A graphic example with four vertices labeled a, b, c, d and four edges can be seen in FIG. 11.

As an embodiment, the alcohol system may be modeled with an agent-dependent, time dependent stochastic digraph. The vertices of the digraph represent the state of an agent (including factors such as physical location, present activity, BAC level, etc.). The edges represent a decision/action that takes the agent into a new state. The agent generally represents any individual in the population, including alcohol users and non-alcohol users (also referred to as non-users). The edge going from one state to another generally has a conditional probability attached to it; hence the notion of a stochastic digraph exists. The conditional probability attached to a given edge depends on the specific sub-population, from which the agent is drawn; hence the present invention is agent-dependent. The conditional probability may also depend on the time of day or night; hence the present invention is also time-dependent.

The exemplified model herein focuses on short-term modeling of a single day. In essence, this model tends to remove the need to model court action, but not law enforcement. It also tends to remove the need to model the impact of producers, but not distributors. Furthermore, it tends to remove the need to model treatment centers, but not prevention programs. By limiting the model to one day, the modeling process and the data requirements can be simplified.

Yet, the present invention also allows for the modeling of more subtleties, as well as broadened limitations. Such approach provides more modeling flexibility so that more complex or less complex models can be formulated, depending of the purpose(s) and goal(s) of a study. Modeling more complex interactions can introduce a need for putting feedback into the system. They can also introduce a need for collecting additional data for estimating conditional probabilities built into the model.

Generally, the directed graph is tree-structured with leaf nodes (i.e., vertices with edges pointed to them, but for which there are no edges pointed away from them). The leaf nodes correspond to the outcomes, which may be one of the benign outcomes or one of the acute outcomes.

In the exemplified model, an agent can experience only one acute outcome per day. If the agent experiences no acute outcomes in the day, the agent has a benign outcome. A path through the digraph represents the path of an agent from the agent's initial state to final resolution of his or her decisions/actions at the leaf node. The path may be very simple; it may involve only two or three vertices. However, it may be very complex, following the many activities of an agent throughout the entire day. Because there may be conditional probabilities attached to each edge, the outcome for agents with identical starting states may be very different. Also, there may be feedback loops, where, for example, there exists repeating offenders with old and/or new patterns of behavior.

Using a directed graph can prove to be a very fruitful device to stimulate clear thinking about the possible sequence of states and/or actions for any agent. By creating the directed graph, one can sequence the set of states such that the consequences of a single decision/action can be carefully envisioned independent of the agent. The agent may affect the conditional probabilities (including possibly setting some to zero), but not the general structure of the digraph. Normally, interventions alter conditional probabilities differentially for agents from different sub-populations, socioeconomic status, geographic regions, age, and racial/ethnic backgrounds. Because the model and simulation may account for a wide variety of acute and benign outcomes simultaneously, one is able to estimate probabilities of outcomes simultaneously (i.e., estimate probability distributions over the leaf nodes).

The present invention contrasts that of the known, more conventional, pure statistically-based alcohol studies, which examine static data and draw limited conclusions. For example, most alcohol consumption is associated with beer consumption. Beer purchased in outlets is often consumed nearby. To reduce local violence, more law enforcement may be added to police these outlets. Alternatively, taxes on alcohol purchases can be increased. However, there appears no way to assess the impact on other acute outcomes or determine whether such actions reduce the overall probability of acute outcomes. The agent-based stochastic digraph model/simulation allows for the dynamic adjustment of conditional probabilities such as these so that the final distribution of probabilities among all outcomes may be assessed. Quite often, one would like to raise the probability of a benign outcome while simultaneously lower the probability of acute outcomes, such as assault, domestic violence or DWI. However, it is possible that certain interventions may reduce probabilities associated with some acute outcomes, increase the probabilities associated with other acute outcomes, and still not reduce the overall probability of acute outcomes.

The stochastic digraph model can be exploited as a simulator by using a Monte Carlo simulation to decide a path through the digraph for each agent generated. At each node (state), there may be a conditional probability distribution for the next node (state) associated with the agent and time of day and the decision/action that the agent makes. The same decision/action for the same time of day and the same agent can possibly have different outcomes. However, it must have some outcome so that the conditional probabilities must add to one. In other words, at each node a randomly generated number between zero and one may be used to decide to which node the agent is taken. This randomness may ultimately lead each agent to transition to one leaf node, which may be an acute outcome or a benign outcome. By introducing many agents into the digraph, one can dynamically simulate the probability distribution of outcomes. By adjusting the interventions, which corresponds to adjusting certain transition probabilities, one can examine how those interventions affect the probability distributions of outcomes.

Figure 12:
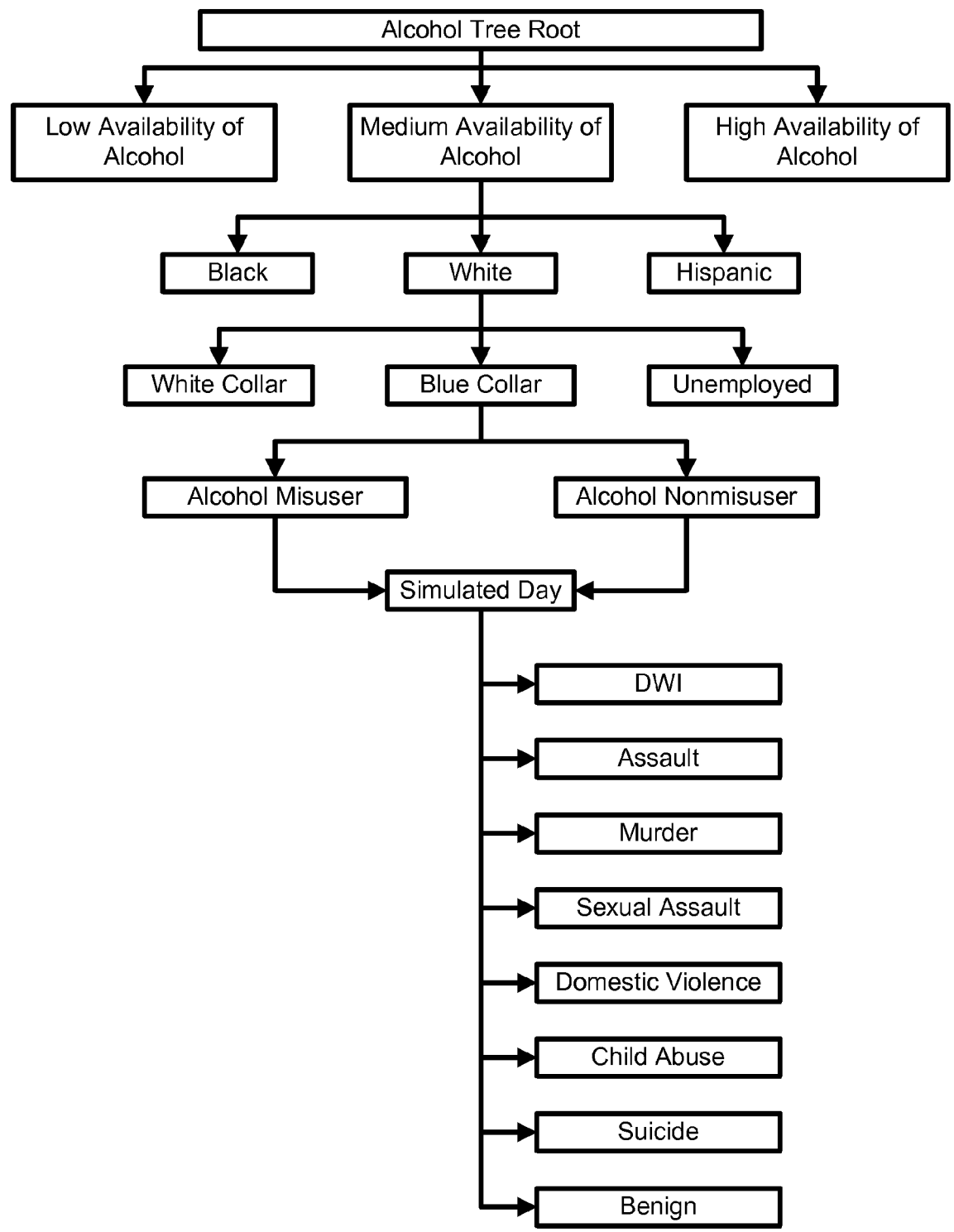
FIG. 12 shows an example of an abbreviated alcohol tree.

FIG. 12 illustrates a simplified version of the stochastic directed graph, namely the alcohol tree. The bottom portion is replicated for each of the nine ethnicity-job class pairs. In this tree, the subtree located under the white race is replicated (but not shown) under the black race and under the Hispanic ethnicity. Similarly, the subtree located under blue collar is also replicated (but not shown) under white collar and unemployed. This replicated structure makes this tree structure ideal for programming in an object-oriented language, such as JAVA.

IV. THE DATA

A. At The Macro Level

A broad array of data sources may be necessary to facilitate the development of an alcohol ecosystem model. Data is required for a multitude of purposes, ranging from providing detailed population characteristics for the areas to be modeled to information on specific drinking behaviors by age and demographic groups.

Demographic information may be obtained from the U.S. Bureau of Census (Census). Census data provides detailed information on demographic distributions of characteristics such as age, gender, race/ethnicity, and socioeconomic status (e.g., median income, poverty status, etc.). These data are available from the decennial census and updates. Data on all full-count and long form census items are typically available at the tract and block group levels of geography.

Data on alcohol-related behaviors are critical to the development of the alcohol digraph model because specific inputs are often needed for the model. Additionally, data on alcohol-related outcomes are typically used for model calibration. Local and state databases may provide some of the relevant information. However, it may be the case where no single data source is able to provide the necessary detailed data. Although no single source of data is likely to be sufficient, data may be adequately obtained from a combination of local, county, state, national, and specialty data sources.

These data sources can be supplemented with national databases, including but not limited to those presented and developed by the National Institute Alcohol Abuse and Alcoholism's (NIAAA) Alcohol Epidemiologic Data System (AEDS). AEDS issues special reports on topics such as alcohol problem indicators and alcohol-related mortality trends. A multitude of national data sources may also be utilized, including the Center for Disease Control's (CDC) Behavioral Risk Factor Surveillance System, National Survey on Drinking and Driving Attitudes and Behaviors, National Longitudinal Alcohol Epidemiologic Survey (NLAES), National Alcohol Surveys (conducted by the Alcohol Research Group), National Health Interview Survey (NHIS), National Health and Nutrition Surveys (NHANES), National Survey on Drug Use and Health (NSDUH), and the National Survey of Substance Abuse Treatment Services (NSSATS). This combination of data sources can provide a varied and rich source of information for model building.

B. At The Micro Level

Focusing on Fairfax County, Northern Virginia was a deliberate choice because of advantages previously mentioned. The required demographic and geographic data are available from county sources. Extensively studied, the Northern Virginia (metropolitan Washington, D.C.) transportation has an excellent database. Alcohol usage data are available from both the Virginia Department of Alcoholic Beverage Control and the Virginia Alcohol Safety Action Program. Information on acute outcomes involving felonies is part of the record of the Circuit Court (e.g., the VA Circuit Court of the 19th Judicial District).

Data can be collected for Fairfax County from a multitude of places. These include, but are not limited to, the Virginia Department of Motor Vehicles (DMV), Virginia Department of Alcoholic Beverage Control, Virginia Police Department, Fairfax County Police Department, Fairfax County Crime Data Analysis Department, Fairfax County Criminal Investigation Bureau, Virginia Department of Health, Hospitals, INOVA. Fairfax Hospital, INOVA. Trauma Center, Fairfax/Falls Church Community Services Board (CSB), Office of Substance Abuse Services (OSAS), SAMHSA, Virginia Commonwealth Tax Administration Office, Fairfax County Board of Supervisors, U.S. Postal Address Management Services, Fairfax County Health Information Services, Fairfax/Falls Church Community Services Board Alcohol Drug Services, Division of Alcohol and Drug Services, Virginia Health Statistics, Fairfax County Citizen Assistance and Information, Fairfax County Demographic Information, Fairfax County Electoral Board, Fairfax County Geographic Information Services (GIS), Fairfax County Public Affairs, Fairfax County Maps and Publications Office, and Fairfax County Department of Management and Budget.

The following Fairfax County data may be used for simulation purposes. FIGS. 13-14 show zip codes and population percentages within Fairfax County. FIGS. 15-16 show zip code population and demographic information. FIG. 17 shows alcohol seller (ABC Store), gallons of alcohol sold and gross sale figures in dollars. FIGS. 18-19 show alcohol establishment license information and status. FIG. 20 shows a low amount of alcohol availability outlets. FIG. 21 shows a medium amount of alcohol availability outlets. FIG. 22 shows a high amount of alcohol availability outlets. FIGS. 23-26 show leading causes of death. FIG. 27 shows resident alcohol induced deaths by race and sex as underlying causes of death in VA of 2000. FIG. 28 shows resident alcohol induced deaths by zip code and race/sex in Fairfax County, Va. of 2000. FIGS. 29-30 show samples of motor vehicle crashes. FIGS. 31-37 show sample crime statistics.

C. Impact on Community-Based Programs

The present invention provides for simultaneous assessment of the impact of interventions on the probabilities of acute outcomes. Such feature allows for a choice of strategies that can reduce societal cost both in human terms (e.g., reduction of unnecessary deaths) and in financial terms (e.g., costs society incurs when prosecuting criminal activity related to undesirable alcohol behaviors). Furthermore, the use of the relatively homogeneous clusters of agents in the model formulation has the added advantage of identifying at-risk subpopulations, and the dynamics of their adverse alcohol-related behaviors.

Moreover, the present invention's dynamic character makes it possible to identify specific times, places and circumstances for adverse behaviors for subpopulations, and thus making subpopulation specific community-based programs possible. Alcohol abusers and alcoholics often need intense treatment therapies, including detoxification, educational programs and medical treatment. In contrast, the user who is physically less tolerant of alcohol is often more profoundly affected by acute outcomes and usually needs a different type of treatment. Identifying subpopulations at risk for both types of behaviors can likely reduce overall societal cost by targeting appropriate treatment.

V. ESTIMATING THE PROBABILITIES

A. The Fairfax County, Va. Model

A general strategy in estimating the probabilities involves using a frequentist approach based on collected data. For the most part, data was not collected according to a randomized designed experiment. Hence, the relative frequencies may be somewhat problematic.

Figure 38:
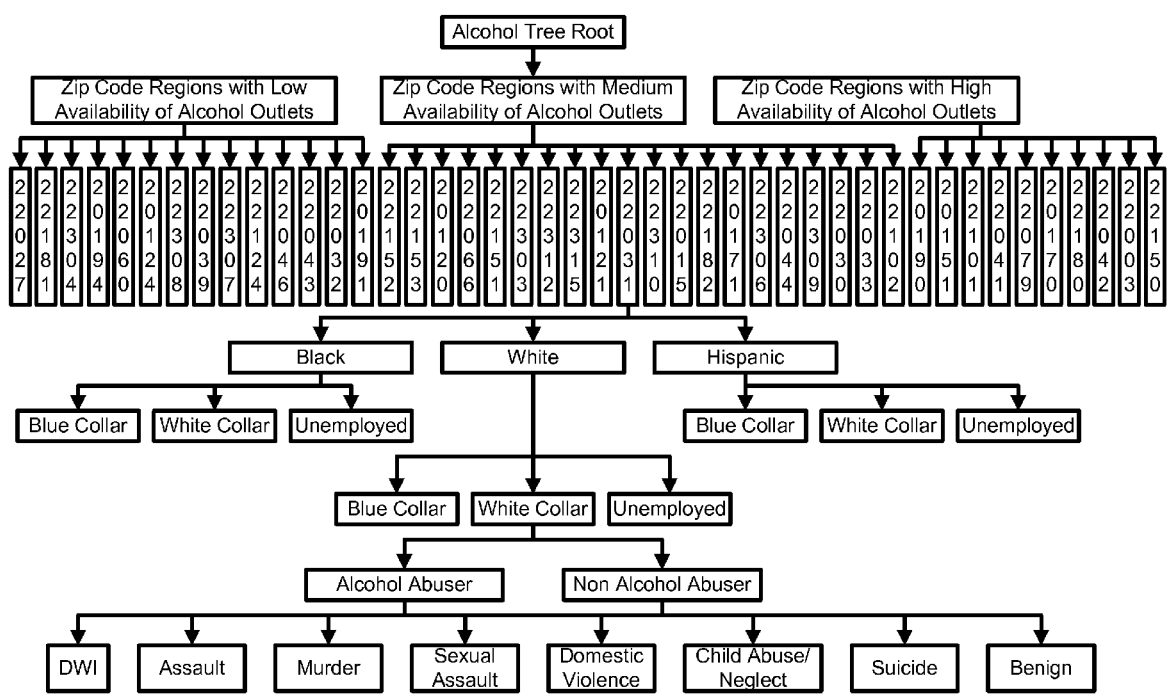
FIG. 38 shows another example of an alcohol tree directed graph.

Using Northern Virginia as an example, the basic structure of the directed graph used in the simulation is provided below. Similar to FIG. 12, FIG. 38 also shows another example of an alcohol tree root of the directed graph. It may begin with selecting a zip code. There are 47 zip codes within Fairfax County, Va. The probability of selecting an agent from a zip code region can be made proportional to the population within the zip code. For example, zip codes with low availability of alcohol outlets may be grouped together. Similarly, zip codes with medium availability of alcohol outlets may be grouped together. Likewise, zip codes with high availability of alcohol outlets may be grouped together.

An agent can be selected within the zip code. The agent may be chosen based on one or more factors, such as ethnicity and/or job class. Where two or more factors are selected, they may be combined to form a joint distribution. In this example, the joint distribution of ethnicity and job class, as indicated in TABLE 1, was based on data from the U.S. Bureau of Labor Statistics (BLS) since data at the Fairfax County level was not currently available.

TABLE 1

Ethnicity v. Job Class Joint Probabilities
Joint Probabilities (Ethnicity v. Job Class)

| | White Collar | Blue Collar | Unemployed |
|---|---|---|---|
| White | 0.337 | 0.613 | 0.052 |
| Black | 0.236 | 0.657 | 0.108 |
| Hispanic | 0.160 | 0.763 | 0.077 |

Another inquiry for the simulation can de determining whether the agent selected is a misuser of alcohol (also known as alcohol abuser) or nonmisuser (also known as non-alcohol abuser). "Misusers" are defined as individuals who are either alcohol abusers or alcohol dependent as defined in the NLAES data. In this example, the conditional probability of being a misuser may be dependent on ethnicity, job class and zip code. The NLAES study generally provides that the conditional probability of being an alcohol misuser is conditioned on job class. BLS provides the joint distribution of ethnicity and job class. Finally, Census provides data on ethnicity by zip code. To calculate the conditional probability of being a misuser given the ethnicity, job class and zip code, an assumption of conditional independence can be made among these three probabilities. Based on this assumption, the desired conditional probability can be approximated. These results are reflected in FIGS. 39-43.

Although these probabilities depend on ethnicity, job class, and zip code, they do not take into account the availability within the zip code. To approximate the availability effect, one or more assumptions can be made. Within a given zip code, let $n_m$ be the number of misusers, $n_n$ be the number of nonmisusers, $n_p$ be the population of the zip code, and $n_o$ be the number of outlets. In one assumption, $n_o \leq 0.5 n_p$. In another assumption, $n_m$ is proportional to $n_o$. If $n_o = 0.5 n_p$, then $n_m = n_p$. If $n_o = 0$, then $n_m = 0$. These assumptions result in $n_m = 2 n_o$. Therefore, discounting the ethnicity, job class, and zip code factors, the $n_n = n_p - n_m$.

Let $P(m \backslash e, j, z)$ be the probability of being a misuser given ethnicity, job class, and zip code and $P(m \backslash e, j, z, a)$ be the probability of being a misuser given ethnicity, job class, zip code, and alcohol availability. The excess probability due to availability can be calculated as $$P(m \backslash e, j, z, a) = P(m \backslash e, j, z)(1 + 2 n_o / n_p). \qquad (1)$$

As equation (1) serves as a working approximation, it likely needs to be calibrated with real data. The maximum value of this factor is 2. Thus, it is possible to double the conditional probability of being a misuser, depending on the availability.

It should be noted that in this example, the probability of an acute outcome depends only on whether the agent is an alcohol misuser or not. However, such general assumption tends not to be realistic because once someone is under the influence of alcohol, it generally does not matter what is the user's ethnicity, job class and/or home location. Thus, other factors (e.g., gender, age, etc.) need to be considered. As previously mentioned, the present invention is flexible to be modified and allow more factors to be taken into account.

B. Hierarchical Statistical Estimation

A key element for estimating probabilities is to divide the population into relatively homogeneous subpopulations based on the idea that their behaviors with respect to alcohol will likely be relatively homogeneous. Even so, it is desirable to model variability into such a subpopulation.

Let D be the digraph representing the possible states of an individual, for example, traveling to work or in a bar or at home, working or engaged in recreation, sober or inebriated. As previously discussed, each simulated agent x moves randomly among the vertices of D according to agent-dependent, time-varying transition probabilities:

$$P_{mn}(x;t) = \text{Prob}\{\text{Next node is } n | \text{Current node is } m (\text{and all other past information})\} \quad (2).$$

Ideally, a full model of the behavior of every individual should be made. However, such a modeling effort generally entails estimation of far too many parameters relative to available data. Yet, at the same time, variability among agents remains essential. As a compromise, it is envisioned that Bayesian hierarchical models may be employed. A manageably small number of classes of individuals representing different socio-demographic and geographical characteristics may be defined. For example, single college students living in Kansas City, Mo. may be selected as a class. Individuals in class X are to have random varying, but statistically, identical transition matrices. In essence, one would likely need only to estimate a prior distribution on transition matrices associated with each class.

Ignoring time dependence for the moment, the probabilities $P_{mn}$ (x) are selected randomly from a distribution over transition matrices. For both modeling flexibility and technical reasons, the model may employ class-dependent Dirichlet prior distributions for each row of the transition matrix. That is, with x∈ X and m fixed, the probabilities $P(\bullet) = P_m \bullet (x)$ may be sampled from a Dirichlet distribution:

$$f(p, \beta^{X,m}) = \frac{1}{\psi(\beta^{X,m})} \prod_n p_n^{\beta_n^{X,m}-1} \quad (3)$$

where $\psi(\beta^{X,m}) = \Pi_n \Phi(\beta_n^{X,m})/\Phi(\Sigma_n \beta_n^{X,m})$ and $\beta^{X,m}$ are class-dependent parameters to be estimated. Mathematically, the Dirichlet distribution is the conjugate prior for the multinomial probabilities represented by $P_{m\bullet}(x)$.

Alternatively, an assumption can be made where all individuals in a class have exactly the same transition probabilities: $P_{m\bullet}(x) \equiv P_{m\bullet}(X)$ for all x∈X. This alternative is not likely to reduce the number of parameters to be estimated, but should significantly reduce the richness of the simulation. Time dependence can be handled similarly. Time can be quantized, for example, into {morning, noon-time, early afternoon, late afternoon, evening, night}, which may lead to Dirichlet hyperparameters $\beta^{X,m,\tau}$, where τ is a time interval. In effect, time can be inserted into the modeling hierarchy.

In principle, it may also be necessary to model the sojourn times that an agent spends in various vertices of the digraph. Markov renewal processes, which may allow such distributions to depend (sometimes only) on the current and next states, are a potential tool. However, estimation of class-dependent and time-dependent (hyper- or not) sojourn distributions tends to be impossible from currently available data. Minimally, a Markov assumption should be imposed that sojourn times, be distributed exponentially and depend only on the current state (which may allow the use of hierarchical models for sojourn times as well as states).

1. Estimation

The hierarchical model for transition probabilities contained in equations (2) and (3) requires estimation of $$K_X \times |L|^2 \times K_\tau \quad (4)$$

Dirichlet hyperparameters, where $K_x$ is the number of classes, $|L|^2$ is the number of vertices in the digraph and $K_\tau$ is the number of intervals into which time is quantized. Plausible values for these are $K_x=10$, $L=20$ and $K_\tau=6$, which leads to 24,000 parameters.

Although estimation of individual Dirichlet hyperparameters $\beta^{X,m,\tau}$ is straightforward (relevant count data may be used directly), the estimation of these parameters from diverse and limited data tends to be a significant challenge. However, strategies remain available. Examples of strategies include, but are not limited to, additional assumptions, structural assumptions (such as that on the digraph) and expert opinion. An example of an additional assumption is one that, for some vertices $m\beta^{X,m,\tau}$, does not depend on X or τ. A structural assumption on the digraph may force some of the $P_{mn}(X,\tau)$ to be zero, (i.e., some or even many transitions may be impossible). Expert opinion may be used to provide values of $\beta^{X,m,\tau}$ for which data are nonexistent or too weak.

An extreme, but potentially viable assumption for sojourn time distributions may be that the distribution of the sojourn time in vertex m is an exponential distribution depending only on m, and not on the agent's class or the time of day. In such case, only as many exponential parameters (of associated Gamma distribution hyperparameters) may need to be estimated. Yet, a significant problem may still remain: characterization and quantification of the uncertainties associated with various estimated values and propagation of these to uncertainties in the output of the simulation.

2. Simulation

In part to characterize uncertainties, and in part, because closed form computation of probabilities of adverse outcomes is not feasible, it is necessary to perform at least one simulation (sometimes multiple simulations). Principal steps in this process include the following. One, for each individual agent x, determine its class X(x). This determination may be done either deterministically or stochastically. Two, for each agent in class X and each time interval τ, stochastically generate transition probabilities $P_{mn}(X,\tau)$ using equation (3) Dirichlet distributions with hyperparameters $\beta^{X(x),\bullet,\tau}$. It can be the case that a more efficient implementation can generate $\beta^{X(x),m,\tau}$ only if x ever enters vertex m during time interval τ. Three, stochastically generate sojourn time distributions $D_{mn}$ (x,τ). Four, using the stochastically generated transition probabilities $P_{mn}(x,\tau)$ and sojourn time distributions $D_{mn}(x,\tau)$, simulated and record the day-long path of agent x through the digraph.

The computational effort should be, to first approximation, linear in the number of agents and be quadratic in the number of vertices in the digraph. This effort is feasible. Also, this effort should be linear in the number of replications of the simulation.

3. Possible Simplifications

A strategy for modeling transition probabilities is to augment equation (3) with dependence on covariates. This kind of modeling can be useful in modeling the dependence of transitions on covariates, such as age, gender, time of day, etc. Several kinds of discrete choice models may be possible. For simplicity, one may consider the multinomial logistic model for k choices specified as follows. For agent x, suppose there are covariate vectors $v_{xm1}, \ldots, v_{xmk}$ and a parameter vector w such that the probability of making choice n, $1 \leq n \leq k$, given state m is:

$$P_{mn}(x) = \frac{e^{\varphi'_{xmn} w}}{\sum_{i=1}^{k} e^{\varphi'_{xmi} w}}. \quad (5)$$

As a simple example, consider the following model. Suppose an agent has finished work and must make a choice among three activities: (1) go home, (2) stop for a drink or (3) do some other leisure activity, such as eating or shopping away from home. The probability model may depend on two or more other factors, such as the agent's gender and the time of day. For simplicity, time of day may be discretized to six periods. Then, a simple model can be coded as:

$$\varphi'_{xmi} w = x_{1i} w_1 + x_{2i} w_2 + x_{3i} w_3 + l_x w_4 + d_{x1} w_5 + d_{x2} w_6 + d_{x3} w_7 \quad (6)$$

where the $x_{ni}$ terms are dummy variables for activities, $x_{ni}=1$, n=i and $x_{ni}=0$, n≠i.

Similarly, $l_x=1$ if agent x is male and zero otherwise is a dummy variable for gender. The $t_{xn}$ are dummy variables for three of the four time-of-day periods.

More generally, this discrete choice model can be used as part of a hyperprior specification for the Dirichlet prior of equation (3). Under equation (3), the prior mean for choice n is:

$$E(P_{mn}(x)|\beta^{X,m}) = \frac{e^{\beta_n^{X,m}}}{\sum_i e^{\beta_i^{X,m}}}. \quad (7)$$

Therefore, the parameters of the Dirichlet prior for agent x can be modeled as:

$$\beta_n^{X,m} = \varphi'_{xmn} w + \epsilon_{xn} \quad (8)$$

for suitable independent mean zero random variables $\epsilon_{xn}$ and agent x in class X. The number of transition probabilities to be estimated by judicious use of the model.

Estimates of a portion of these probabilities can be obtained from trip and activity data sets. For instance, the choice model without the drinking choice may be estimated from such a data set. One property of the simple multinomial logistic choice model is independence of irrelevant alternatives. Specifically, the following simplified choice model can be considered:

$$P_{mn}(x) = \frac{e^{\beta_n}}{\sum_{i=1}^{k} e^{\beta_i}}. \quad (8)$$

For any subset $N \subset \{1, \ldots, k\}$, it can be easy to show that the conditional probability of choice n given n∈N is simply $$P_{mn}(x|n \in N) = \frac{e^{\beta_n}}{\sum_{i \in N} e^{\beta_i}}. \quad (9)$$

These calculations mean that certain parameters can be estimated from marginal data. One can estimate some parameters in these models from other data sets (such as a Portland, Oreg. data set) without drinking behavior. Furthermore, one can add parameters for drinking alternatives to match conditional probabilities from other surveys.

VI. ALCOHOL TREE SIMULATOR

A. Terminology

HTML is the coding language used to create Hypertext documents for use on the World Wide Web. HTML is a standard of the World Wide Web Consortium (W3C).

DHTML, or Dynamic HTML, is a method of combining HTML, CSS, DOM, and scripting languages (such as Javascript, ECMAScript, etc.) to allow for dynamic client-side manipulation of presentational components. When used appropriately, DHTML can eliminate the need for a server request each time an action is to be performed, dramatically increasing the speed of interaction with the application.

CSS, or Cascading Style Sheets, is a specification for the presentation of HTML marked documents. CSS works like a template, allowing Web developers to define styles for individual HTML page elements. CSS is a standard of the World Wide Web Consortium (W3C).

DOM, or the Document Object Model, is a programming interface that allows HTML pages and XML documents to be created and modified as if they were program objects. DOM makes the elements of these documents available to a program as data structures, and supplies methods that may be invoked to perform common operations upon the document's structure and data. DOM is both platform-neutral and language-neutral. It is also a standard of W3C.

Javascript (formally known as ECMAScript, as defined by the ECMA-262 standard) is a scripting language originally developed by Netscape. It is commonly used to make HTML documents more interactive, as it allows direct access to the underlying page DOM. Despite its name, JavaScript is not related to Java.

ASP.NET (sometimes referred to as ASP+) is the latest version of Microsoft's Active Server Pages technology (ASP). ASP.NET is drastically different than its predecessor in three major ways. One, it supports code written in compiled languages such as C++, C#, and J#. Two, it features server controls that can separate code from the content, allowing WYSIWYG editing of pages (when using the Visual Studio .NET Interactive Development Environment (IDE)). Three, it is fully Object-Oriented; based on the .NET runtime, it has full access to the underlying .NET class library.

Although ASP.NET is not backwards compatible with ASP, it is able to run side by side with ASP applications.

DLL, or Dynamic Link Library, is a file of functions that is compiled, linked and saved separately from the processes that use them. DLL functions can be used by more than one running process. The operating system maps DLLs into the process's address space when the process is either starting up or while running.

WYSIWYG is an acronym for "what you see is what you get." WYSIWYG HTML Editors like Dreamweaver or Frontpage let one create web pages by displaying exactly how it will look in a browser. With this feature, intrinsic knowledge of HTML is not necessary. However, using WYSIWYG editors tends to be problematic because of their use of nonstandard, proprietary and deprecated mark-up. Therefore, the present invention does not use any WYSIWYG editors.

Java, developed by Sun Microsystems, is a network-oriented programming language that is specifically designed for writing programs that can be safely downloaded to the computer through the Internet and immediately run without fear of viruses or other harm to the computer or files. Using small Java programs (called Applets), Web pages can include functions such as animations, calculators and other fancy tricks. Java is a simple, robust, object-oriented, platform-independent, multi-threaded, and dynamic general-purpose programming environment. It is best for creating applets and applications for the Internet, intranets and any other complex, distributed network.

J#.NET is a powerful tool for Java-language developers who want to build applications and services on the Microsoft NET Framework. It targets the .NET Framework version 1.1, is fully integrated with Visual Studio .NET, and provides added support for building Mobile Web applications. J#.NET includes technology that enables users to migrate Java-language programs to the .NET Framework (often with minimum time). Existing applications developed with Java can be easily modified to execute on the .NET Framework, interoperate with other Microsoft .NET connected languages and applications, and incorporate .NET functionality, such as ASP.NET, ADO.NET and Windows Forms. It should be noted that J#.NET is not a tool for developing applications intended to run on a Java virtual machine. Applications and services built and compiled as J# (.NET) code generally runs only in the .NET Framework; they typically do not run on any Java virtual machine. Independently developed by Microsoft, J#.NET is neither officially endorsed nor approved by Sun Microsystems, Inc.

Just-In-Time or JIT refers to a compiler for the Java language that allows interpreted Java programs to be automatically compiled into native machine language on the fly, for faster performance of the program.

B. Component Overview

Components of the simulator can be written using Java and J#.NET. Both are object-oriented development languages implementing the Sun Java Language Specification. These two languages are not binary compatible. However they are mostly source-compatible.

Both these compiled languages are similar to C and C++. A major difference is in the "level of compilation" achieved. In C, for instance, the code would be compiled down to raw x86 (assembly language) instructions, which would form the binary executable. One problem with this method of compilation is portability. If code is run on a different platform or architecture, many system calls and hooks using #IFDEF preprocessor logic must generally be changed. Basically, the compiler itself is allowed to conditionally include portions of code depending on architecture type. For instance, to target a WIN32 architecture, the code is placed inside an #IFDEF WIN32 block, in which case it would only be compiled if the architecture matched. Such placement is standard C and C++ fare. In Java, however, since the binary executable contains Virtual Machine (VM) code, which is one level above Assembly Language, the VM can execute the code in the same fashion regardless of which system architecture is currently being used. One can think of this, in a sense, as a form of integrated compatibility layer built into the language itself. However, VM contains a very sophisticated method of dynamically compiling code JIT as the executable is running. An additional benefit of this JIT Compilation is that it can perform architecture-specific optimizations at runtime, something a traditional C or C++ program can likely never (let alone reasonably) achieve. These optimizations can dramatically increase the speed of the executing Java application, sometimes making them even faster than their C and C++ counterparts.

The present invention can be hosted on an IIS6.0 web server running ASP.NET with the NET Framework version 1.1.

C. Simulator Processes

The alcohol tree simulator may be a web-based application or a software program. It may even be built into a device. The alcohol tree simulator may incorporate three main processes of functionality: the alcohol tree simulation process, the map generation process and the presentation and (client-side) user-interaction process.

1. Alcohol Tree Simulation Process

The alcohol tree simulation process is the one that actually performs the simulation given the number of agents and runs. This program may comprise a multitude of Java classes. Each Java class may be contained in a file of the same name. For instance, a class named "Node" will be in a file named "Node.java." The program may be designed using a "tree."

Trees in computing are similar to real-life trees. A computing tree has a "root" node along with one or more hierarchal child nodes. The rootnode is the node at the top of the tree, with no parent in the hierarchy.

The "AlcoholTree" class can serve as the main class for the program. It can perform the actual simulation given the number of agents and output file it should use. Typically, there is a command line version of the simulation, such as java AlcoholTree 1000000 C:\fairfax.txt. This command line may be found in the same command line directory as the compiled java code (.class files).

Figure 44:
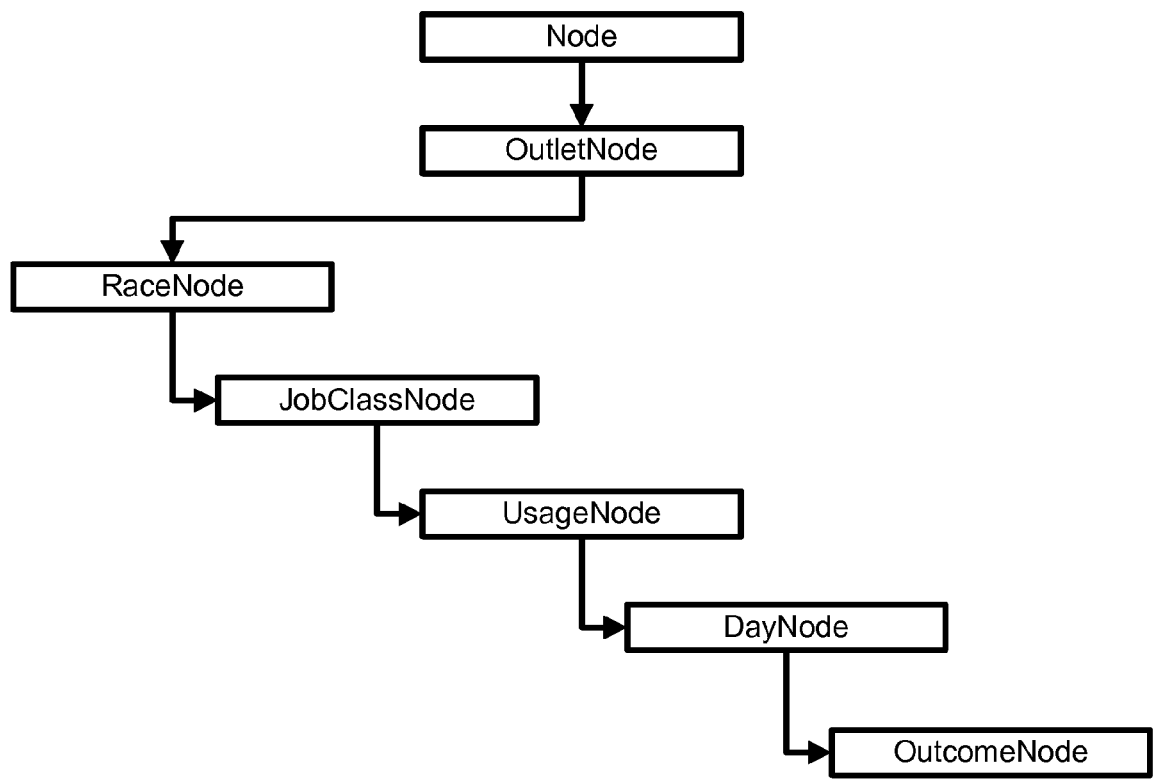
FIG. 44 shows an example of JAVA class nodes and their relationship.

The "Node" class is the base class for the program. It generally describes a default node that is capable of having multiple children, which may be defined by each individual class. The "OutletNode" class extends the "Node" class; in essence, it intrinsically inherits the attributes of the "Node" class. Each of the other classes, in turn, may inherit from another class. FIG. 44 illustrates an example of the order of inheritance. In particular, JAVA class nodes and their relationship are shown.

In reality, there is often no reason for each of the different node classes to inherit from the previous node class. They could all just as easily inherit from the base "Node" class itself. The reason for having such a structure is if the subsequent child node classes require access to variables or functions in the parent node class. However, such a case does not really apply here.

As previously noted, FIG. 12 shows an example of an abbreviated alcohol tree. Because of size constraints, this tree does not include every possible combination. Each level of the tree may be repeated for each node above it. For instance, the "Non Alcohol Misuser" node here also has a "Simulated Day" child node with corresponding seven acute outcomes. Similarly, there are "Alcohol Misuser" and "Non Alcohol Misuser" child nodes for the "White Collar" and "Unemployed" nodes. From a literal interpretation, it may appear that only the "Blue Collar" node has "Alcohol Misuser" and "Non Alcohol Misuser" nodes, which is not the case.

Each of the Node classes contains probability values that may be utilized by the simulation in determining whether an acute outcome occurs. The probabilities may correspond to the different types of the node. For example, there can be three types of OutletNodes—one for each low alcohol availability, medium alcohol availability and high alcohol availability.

The alcohol tree simulation process may begin by inputting a number of agents. For a particular geographic area (e.g., town/city, county, state, nation, etc.) of interest, a default number may be entered. This number may be based upon Census data.

2. Map Generation Process

Results from the alcohol tree simulation process may be generated as a map for display. Initially, processing actual GIS shapefile data may need to take place by processing both the .SHP file and the .DBF file. The .SHP file contains zip code regional point data as paired latitudinal and longitudinal coordinates. The .DBF file associates an actual zip code number with the grouped coordinate data previously read from the .SHP file. This .DBF file may also contain additional information, such as the computed regional area.

The .SHP, or ESRI Shapefile, data format stores non-topological geometry and attribute information for the spatial features in a data set in a binary file. The geometry for a feature is stored as a polygonal "shape" comprised of a set of vector coordinates (representing latitude and longitude).

An ESRI "shapefile" comprises a main file and a dBASE table (of the same name, with .DBF extension). The main file is of variable-record-length; each individual record describing a shape with a list of its vertices. The dBASE table contains feature attributes with one record per feature, causing a one-to-one relationship between the geometrical and attribute data between files. For reading in the ESRI shapefiles, slightly modified classes (or components) originally from the CCmap application may be used. Essentially, this modification may allow for the opening and reading in the raw binary data from the underlying file "stream," according to the ESRI data specification. These data may be stored locally for later use.

Next, the coordinate data may be scaled from latitudinal and longitudinal coordinates to X and Y pixel values. A simple operation may be used to accomplish this task, where x=original X value (longitude), bL=minimum X value in the entire GIS shapefile (bounds), bH=maximum X value on the entire GIS shapefile (bounds) and d=resulting image dimensions (width and height). Scaled X can then be seen as:

$$\text{Scaled } X = \frac{(x - bL) \times d}{bH - bL}. \quad (10)$$

Likewise, scaled Y can be seen as:

$$\text{Scaled } Y = \frac{(y - bL) \times d}{bH - bL}. \quad (11)$$

With their scaled X and Y pixel positions, a list of zip code regions can be drawn. Each of these regions can be logically organized as a "ZipcodeRegion" object.

Afterwards, the maximum number of acute outcomes in a single zip code region can be calculated. Where maps are to be presented in color, this maximum number can be used later to dynamically adjust color intensity.

It should be noted that while the maps may be presented in color, the present invention also allows for drawings to be displayed in black and white. For example, FIG. 45 shows the intensity and representative scale of acute outcomes with probabilities based on actual data. Hence, color map characterization represents just one aspect of practicing the present invention and is not to be construed as the only way of representing data results.

Zip code regions may be drawn as closed polygons using their scaled X and Y values. Then, the zip code region intensity may be calculated to determine the color used to fill the particular region. The intensity can be calculated as the percent of acute outcomes occurring in an individual region relative to the maximum number of acute outcomes happening in any region (calculated previously). Based on this "intensity value," the actual color value (amount of red, green, and blue) is scaled accordingly.

A computer screen comprises of approximately one million pixels. Each of these pixels has a red, green, and blue component. A value of 0 (no color) to 255 (full color) is assigned to each of these components to determine its color. White can be created by combining all of the colors; in essence, white can be represented as {R=255, G=255, B=255}. Shading can also be varied. For example, to vary the shading between white and red, the green and blue values can be modified while keeping red constant at 255 based on the intensity value previously calculated. The default value for each polygon is typically white (where R, G, B=255). B and G values may be decreased inversely proportional to the ratio of the outcomes in one area to the maximum value in any area. Where the intensity value is used to directly determine the amount of green and blue of the individual pixel, a maximum of 254 shades between red and white can be obtained. In this case, a solid red represents a region with the highest number of acute outcomes, whereas a solid white region represents a region with the lowest number of acute outcomes.

Pie charts may be used to represent populations, such as Blacks, Whites and Hispanics, within each individual zip code region. These are simple percentage calculations using population data, which are used to determine circular angles for each of the three chunks of the pie chart. The charts can be also drawn at region centroids. Exemplified color representation for the pie slices may be as follows: black for Blacks, white for Whites and tan for Hispanics.

Generated maps may also reflect alcohol sellers, alcohol establishments, names of regions, population graphs, road names, etc. Alcohol sellers and alcohol establishments may be located on the maps according to their latitude and longitude coordinates. Each of these data may, singularly or in combination with other data, overlap the intensity of acute outcomes.

3. Presentation and (Client-Side) User-Interaction Process

In general, the presentation layers are two-fold: the server back-end component, which can be an ASP.NET script, and the client, which can be the users' web browser.

As HTTP by nature is a stateless protocol, internal sessions (via cookies) may be used to maintain persistence across web-requests. By default, a single web page "hit" will likely generate two actual underlying requests. The first may output the Alcohol Tree Simulator interface, with its buttons and fields. The second may retrieve the actual map image (previously created) to be displayed.

This process may begin with using the library from the Alcohol Tree Simulation Process to perform the actual simulation, given the number of agents to be simulated. This simulation is likely to occur only on the first of these two underlying requests, as it may be erroneous to re-simulate before the map image is generated and shown.

At this point, an interface may be presented to the user. As one embodiment, the interface may allow client-side interaction via, for example, "DHTML," or Javascript. In other words, the user has the ability to modify data, such as region centroid, region name, alcohol establishment, and alcohol seller (such as the Alcohol Beverage Control (ABC) stores of Virginia). Additionally, where demographic and zip code information are displayed, the proportion of each race and the number of alcohol establishments may be displayed. Such proportion may be adjusted within, for example, the zip code to see zip code specific effects rather than county-wide effects.

The user may also be presented with the underlying probability values used to generate the simulation results. Furthermore, the user has the ability to change and re-run the simulation with new values.

As another embodiment, the interface may allow the user to modify the probabilities used during the simulation. For instance, if an ethnicity adjustment is made in this mode, the individual zip code data can be suppressed and population proportions can be taken county-wide. However, using this mode, the probabilities associated with alcohol availability within zip codes may not be modified. Likewise, alcohol availability can also be similarly adjusted. However, using this latter mode, the probabilities associated with ethnicity within zip codes may not be modified. The simulation may be rerun and the corresponding map can be redrawn accordingly to reflect its new outcome status. Widgets may be used to assist the user to make modifications. For example, FIG. 46 shows a rerun simulation with modifications showing only low outlet availability in each zip code.

Data from the alcohol establishment and alcohol seller may be outputted by the ASP.NET script as HTML elements. These elements may be by default, be hidden and be seen as small, square, colored boxes. These boxes may be shown and hidden via DHTML and underlying DOM element access. More specifically, JavaScript can be used to access the DOM, through which the Document's CSS elements can be accessed and modified accordingly (i.e., to being hidden or visible).

To retrieve the latitudinal and longitudinal coordinates of the alcohol sellers and alcohol establishments, a separate tool may be created to automate the otherwise quite lengthy and error-prone process. This tool can be used to read in individual establishment locations from an XLS spreadsheet file and pass address information onto map query (such as Google Maps). The resulting HTML page may then be analyzed and parsed to determine the actual latitude and longitude of the specified address. It may be the case that the coordinates may be hidden in the map query interface in a custom HTML tag, which may define these values as xPos and yPos attributes. The tool may then store these latitudinal and longitudinal values to a simple text file (one entry per line) to be later read and processed as necessary. An advantage of using this tool is to serve as a look-up table to facilitate address lookups.

The map presented to the user can be made interactive through the use of an HTML "imagemap," which causes an inline frame to display region-specific demographic information (static HTML files, auto-generated by a web-extractor tool for this purpose).

The user may be presented with an option of displaying Simulation Statistics or Detailed Simulation Output. Simulation Statistic (percentage) values may be calculated relative to the total number of agents.

As for the Detailed Simulation Output, a multitude of tables may be generated and presented to the user. FIGS. 47-50 exemplify a detailed output of the level of alcohol availabilities. One table may show the number of acute and benign outcomes for all alcohol misusers and nonmisusers. Another table may show the number of acute and benign outcomes for all White, Black and Hispanic individuals. Yet, another table may show the number of acute and benign outcomes for all White Collar, Blue Collar and Unemployed individuals. A further table may relate actual local police record data to the simulation results by outcome type and may also calculate the standard deviation. The actual police record data can be for a certain time period (such as five-year period) so that the data may be rescaled to a one-year period. The simulation results may also be scaled accordingly if one million agents were not used so that the standard deviation calculations are appropriate. Where the locality to be simulated has a population of approximately one million, the a nominal standard may be set to one million agents. Although the simulation can be done with virtually any number of agents, scaling may be adjusted to make simulated statistics consistent.

a. Alcohol Tree Modified Probability Utilization

A map key can be generated using the maximum number of acute outcomes for a given region, which is calculable in the Map Generation Process, and dividing that number into a number (such as 12) of color shades of varying intensity. An example of color shading intensity is between solid red and solid white. Each of the color values should have an upper and lower bound to it, which may result in the key appearing "seamless." The upper bound color can be the one representing the high-end number of acute outcomes represented by the color shade. Likewise, the lower bound can be the one representing the low-end number of acute outcomes represented by the color shade. Therefore, if a key item had the boundaries of, for instance, 0 to 50, and was colored from white at the bottom to slight pink on the top of the item boundary, then a value of 25 should be located between these two points in color.

b. Color Coded Establishment Types

To color code establishment types, the previously described tool may be used to automate the retrieval of latitudinal and longitudinal coordinates from the map query. Data may be stored in the initial text file, which may contain addresses, zip codes, latitudinal/longitudinal coordinates, etc.

The tool can be modified to include alcohol license types in the resulting text file. These types may represent various licenses as integer values internally. For example, where license information cannot be determined, then integer value zero may be designated. If the establishment has a license to serve alcohol on premise, then integer value one may be designated. If the establishment has a license to serve alcohol off premise, then integer value two may be designated. If the establishment has a license to serve alcohol both on and off premise, then integer value three may be designated.

In the ASP.NET script, after reading in the latitudinal and longitudinal coordinate data, coloring for the establishment point may be determined based on the license value integer previously described. If the establishment has a value of two (off premise only) then it is colored a different color, such as blue. If the establishment has a value of one or three, then it may be colored another different color, such as green.

4. Additional Data

It should be noted that there may likely be occurrences in the generated map where a single zip code has multiple physical boundary regions for it. The reason for this effect is that in the underlying GIS data used to generate the map, there may be times when a single zip code contains multiple physically decoupled "polygonal regions," which in some cases are located within a different zip code region entirely. As an aspect of the present invention, the GIS data being used is the "5-digit Zip Code Boundary" Census data.

It should be further noted that zip codes merely present one embodiment of how the present invention can be used. One skilled in the art would recognize that other forms of boundaries (such as those for determining and selecting agents and/or actors, geographical boundaries, etc.) can be used. Nonlimiting examples include Census tracks, Census blocks, police patrolling areas, zoning districts, political districts, school zones, residential v. commercial areas, etc.

The detailed simulation output may be written for a detailed representation of the simulated "alcohol tree," displayed in its hierarchical form as child "nodes" of one another. At the root hierarchy, three alcohol availability outlets (namely low, medium and high) may be seen. Within each of these outlets are race classes, such as Black, White and Hispanic. Each of these race classes can contain three job classes, namely white collar, blue collar and unemployed. Underneath the job classes can lie a node representing alcohol usage, such as either misuser or non misuser. Within each of these individual nodes may lie final outcome nodes. These may include DWI, assault, murder, sexual assault, domestic violence, child abuse, suicide, and a final node to represent all simulated benign outcomes.

Table 2 Shows Mean Simulated Results for Fairfax County, Va. Model.

TABLE 2

Mean Simulated Results for the Fairfax County, VA Model
Fairfax County, VA Model

| | |
|---|---|
| Average RFA | 0.001365 |
| Average RFB | 0.948489 |
| Average Number of Acute Outcomes | 1365 |
| Average Number of Benign Outcomes | 948489 |
| Average Number of Agents | 949855 |
| Average Number of Runs | 1000000 |
| Average Total DWI | 707.5 |
| Average Total Assault | 132.2 |
| Average Total Murder | 7.4 |
| Average Total Sexual Assault | 33.9 |
| Average Total Domestic Violence | 168.2 |
| Average Total Child Abuse | 216.4 |
| Average Total Suicide | 99.8 |

"Actual Incidents" is calculated as the total number of each incident type from the police data file divided by the number of years of data contained in the file.

Simulated Results are calculated as the total number of each individual outcome type multiplied by a "scaling" factor. Each individual outcome type can be obtained by iterating over all alcohol tree node elements and retrieving ones which apply. In this case, only outcome type nodes appear to apply.

The "scaling" factor may be applied if the simulation is not run with one million agents. By scaling the total number of acute outcomes according to the number of agents the simulation may be run, based on the percentage of agents out of one million agents, for the data between columns. The columns, both actual and simulated, may be comparable.

"Mean Simulated Results" may be calculated by scaling the averaged data accordingly (such as multiplying by ten) to more accurately represent the actual number of "agents" (such as 1,000,000) desired.

The values shown in TABLE 2 appear very close to the actual data collected from the police file. TABLE 3 shows a comparison of simulated data, rounded to whole numbers, and actual acute outcomes.

TABLE 3

Comparison of Simulated with Actual Acute Outcomes for the Fairfax County, VA Model
Fairfax County, VA Model

| Outcome Type | Actual Incidents (1 Year) - Data from Police File | Simulated Results (1 Year) | [Historical] Mean Simulated Results (1 Year) | Mean Square Error | Absolute Deviation |
|---|---|---|---|---|---|
| DWI | 722 | 658 | 708 | 19.6 | 6.4 |
| Assault and Battery | 133 | 107 | 132 | 2.0 | 2.6 |
| Murder | 6 | 4 | 7 | 1.0 | 2.0 |
| Sexual Assault | 32 | 38 | 34 | 4.1 | 6.2 |
| *Domestic Violence | 41 | 168 | 168 | 16.1 | 12.7 |
| Child Abuse/ Neglect | 84 | 213 | 216 | 17.4 | 12.9 |
| Suicide | 49 | 84 | 100 | 2.6 | 2.2 |
| Benign | 998933 | 998728 | 998635 | 888.4 | 7.5 |

*In addition to the Domestic Violence count, there is an actual Domestic Dispute count of approximately 6720 disputes per year.

Based on 100 Monte Carlo replications, the Mean Square Error (MSE) can be calculated using the following formula:

$$MSE = \frac{1}{100} \sum_{i=1}^{100} (simulated_i - actual)^2 \qquad (12)$$

where i is the varying acute outcome (i.e., DWI, assault and battery, murder, sexual assault, domestic violence, child abuse, suicide, and benign outcomes). Absolute Deviation may be calculated as follows:

$$AbsoluteDeviation = \frac{1}{100} \sum_{i=1}^{100} |simulated_i - actual|. \qquad (13)$$

VII. GEOSPATIAL VISUALIZATION OF ACUTE OUTCOMES

Figure 51:
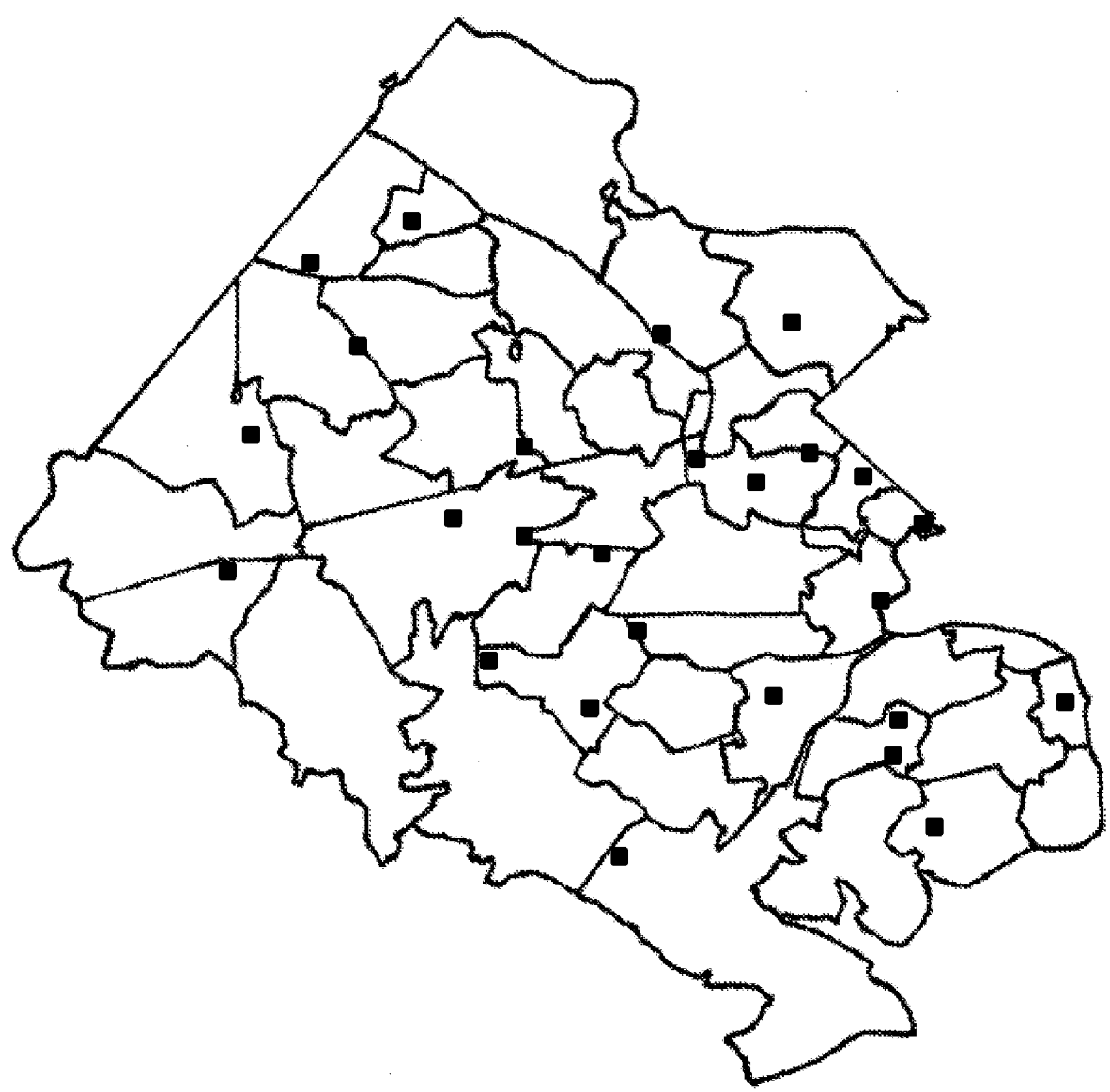
FIG. 51 shows VA state-owned ABC stores located in Fairfax County, Va.
Figure 52:
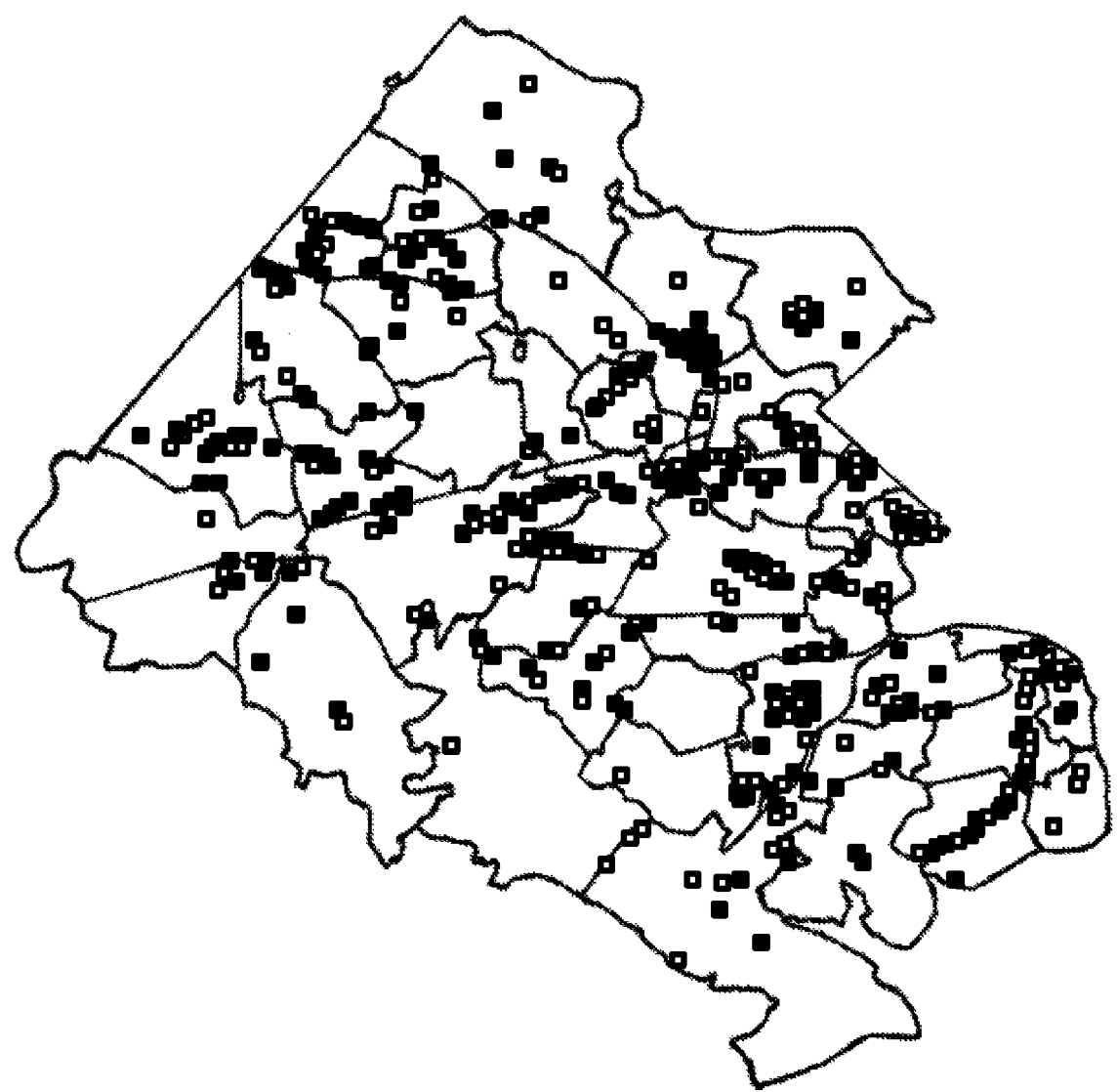
FIG. 52 shows examples of alcohol establishments, both off and on premises, that are licensed to sell alcohol.

Given the alcohol tree structure illustrated in FIG. 12 and the conditional probabilities developed from collected data, a visualization of the geospatial location of acute outcomes within Fairfax County, Va. may be constructed. The data can be aggregated at various levels. For example, the data may be aggregated spatially to the 47 postal codes in Fairfax County. FIG. 45 illustrates the distribution of acute outcomes within Fairfax County. FIG. 51 displays alcohol sellers (VA ABC stores) within Fairfax County. FIG. 52 shows alcohol establishments (both off-premise and on-premise) that are licensed to sell alcohol.

The distribution of acute outcomes in FIG. 45 represents results based on actual data. Higher levels of acute outcomes are indicated by denser dots. In FIG. 52, black squares indicate the location of on-premise outlets, such as bars, taverns, restaurants, etc. Meanwhile, white squares indicate the location of off-premise outlets, such as grocery stores, convenience stores, etc. In FIG. 51, the black squares indicate the location of state-owned distilled spirits outlets. Fairfax County has approximately 866,000 individuals who are either White, Black or Hispanic. The alcohol tree simulator simulated the approximately 866,000 individuals. FIGS. 45, 51 and 52 are based on a simulation using actual conditional probabilities derived from the data and is well calibrated to the actual outcomes experienced during the years 2002 and 2003 from which the data were collected. In FIG. 45, the denser dots on the right-hand side of the map correspond to the City of Alexandria.

A purpose of this tool is to not only see the current geospatial distribution of acute outcomes but to also see what could happen if parameters of the distribution are adjusted, e.g. fewer alcohol outlets, more policing, racial or population shift, etc. FIGS. 45 and 46 are illustrations of existing alcohol-related acute outcomes and what could happen with population shifts.

In FIG. 46, the area with denser dots at the bottom of the page is Fort Belvoir, a U.S. Army base. The area with denser dots near the top is the town of Herndon. The number of soldiers based at Fort Belvoir has been increasing dramatically. Likewise, the Hispanic population in Herndon has also been increasing dramatically. This figure illustrates what could happen if there are substantial population shifts. Here, the density of dots corresponds to the most acute outcomes. The lack of denser dots in Alexandria does not mean that the number of acute outcomes have decreased there. Rather, it demonstrates that the numbers have increased elsewhere. In essence, the manner of interventions can be explored with resulting geospatial illustrations of their impact.

VIII. CONCLUSION

The stochastic digraph model provides an effective tool for simulating the acute violence-related effects of alcohol misuse. In addition, it provides a tool for exploring the consequences of various interventions by adjusting conditional probabilities. Geospatial visualization aspects can allow policy makers to explore "hotspots" that may be potential locations for additional interventions.

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments. For example, the present invention may be used to analyze and determine policy implementations for drugs (e.g., illegal substances, over-the-counter drugs, prescription drugs, etc.), tobacco, banks and similar financial institutions, gas stations, food vendors, retail stores, wholesale stores, sporting events, concerts, diseases and/or other medical-related issues, healthcare, homeland security, elections, etc.

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. §112, paragraph 6. Claims that do not expressly include the phrase "means for" or "step for" are not to be interpreted under 35 U.S.C. §112, paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A tangible computer-readable medium encoded with instructions for creating a social network stochastic directed graph model based on a stochastic directed graph, wherein execution of said "social network stochastic directed graph model" by one or more processors causes said "one or more processors" to perform the steps comprising:
   a. using an activity generator for creating agents in the stochastic directed graph to represent a population stratum;
   b. selecting said agents proportionally to the size of said population stratum and representative activities associated with said population stratum, said agents having a dynamically adjustable and time-varying conditional probability attached to said activities indicating the likelihood of interaction between said agents with at least one other agent or actor;
   c. accumulating outcomes for said interaction, said outcomes including benign outcomes and acute outcomes; and
   d. estimating a multinomial probability distribution based on said outcomes.

2. The tangible computer-readable medium according to claim 1, further including introducing a hierarchical Bayesian structure to said stochastic directed graph.

3. The tangible computer-readable medium according to claim 1, wherein vertices of said stochastic directed graph represent the state of said agents.

4. The tangible computer-readable medium according to claim 1, wherein edges of said stochastic directed graph represent at least one decision that takes said agents from one state into another state.

5. The tangible computer-readable medium according to claim 4, wherein at least one of said conditional probability is attached to said edges.

6. The tangible computer-readable medium according to claim 1, wherein each of said agents is a member of a class, said class being homogenous.

7. The tangible computer-readable medium according to claim 1, further including developing interactions among said agents to adjust said conditional probability that is in connection with said acute outcomes.

8. The tangible computer-readable medium according to claim 1, wherein the structure of said stochastic directed graph and said conditional probability is based on collected data, said collected data including at least one of the following:
- a. surveyed data;
- b. census data;
- c. administrative record data;
- d. national data;
- e. state data;
- f. local data;
- g. expert opinion; and
- h. any combination thereof.

9. The tangible computer-readable medium according to claim 1, wherein the stochastic directed graph neither encodes conditional independence relationships nor infers causality.

10. A social network stochastic directed graph system that uses at least one stochastic directed graph for formulating public policy comprising:
- a. an activity generator configured for creating agents in the stochastic directed graph to represent a population stratum;
- b. an agent selector configured for selecting said agents proportionally to the size of said population stratum and representative activities associated with said population stratum, said agents having a dynamically adjustable and time-varying conditional probability attached to said activities, said conditional probability indicating the likelihood of interaction between said agents with at least one other agent or actor;
- c. an outcome accumulator configured for accumulating outcomes for said interaction, said outcomes including benign outcomes and acute outcomes; and
- d. an estimator configured for estimating a multinomial probability distribution based on said outcomes.

11. The social network stochastic directed graph system according to claim 10, wherein said stochastic directed graph incorporates a hierarchical Bayesian structure.

12. The social network stochastic directed graph system according to claim 10, wherein vertices of said stochastic directed graph represent the state of said agents.

13. The social network stochastic directed graph system according to claim 10, wherein edges of said stochastic directed graph represent at least one decision that takes said agents from one state into another state.

14. The social network stochastic directed graph system according to claim 13, wherein at least one of said conditional probability is attached to said edges.

15. The social network stochastic directed graph system according to claim 10, wherein each of said agents is a member of a class, said class being homogeneous.

16. The social network stochastic directed graph system according to claim 10, further including an interaction developer, said interaction developer configured for developing interactions among said agents to adjust said conditional probability that is in connection with said acute outcomes.

17. The social network stochastic directed graph system according to claim 10, wherein the structure of said stochastic directed graph and said conditional probability is based on collected data, said collected data including at least one of the following:
- a. surveyed data;
- b. census data;
- c. administrative record data;
- d. national data;
- e. state data;
- f. local data;
- g. expert opinion; and
- h. any combination thereof.

18. The social network stochastic directed graph system according to claim 10, wherein the stochastic directed graph neither encodes conditional independence relationships nor infers causality.

* * * * *